US012616633B2

(12) United States Patent
Li et al.

(10) Patent No.: US 12,616,633 B2
(45) Date of Patent: May 5, 2026

(54) MALE SEXUAL STIMULATION DEVICE

(71) Applicant: Dongguan Mimao Electronic Technology Co., Ltd., Dongguan (CN)

(72) Inventors: Yinyuan Li, Dongguan (CN); Qinling Wang, Heyuan (CN)

(73) Assignee: Dongguan Mimao Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/238,553

(22) Filed: Jun. 16, 2025

(65) Prior Publication Data

US 2026/0000571 A1 Jan. 1, 2026

Related U.S. Application Data

(63) Continuation-in-part of application No. 18/757,577, filed on Jun. 28, 2024, now Pat. No. 12,329,709.

(30) Foreign Application Priority Data

Nov. 15, 2024 (CN) ......................... 202422801719.7
Nov. 15, 2024 (CN) ......................... 202422801737.5

(51) Int. Cl.
*A61H 19/00* (2006.01)
*A61H 23/02* (2006.01)

(52) U.S. Cl.
CPC ............. *A61H 19/32* (2013.01); *A61H 23/02* (2013.01); *A61H 2201/1215* (2013.01); *A61H 2201/123* (2013.01); *A61H 2201/149* (2013.01); *A61H 2201/1664* (2013.01); *A61H 2201/169* (2013.01)

(58) Field of Classification Search
CPC ...................................................... A61H 19/32
See application file for complete search history.

(56) References Cited

U.S. PATENT DOCUMENTS

2023/0210718 A1* 7/2023 Zhou ...................... A61H 19/32
600/38
2025/0241819 A1* 7/2025 Chen .................. A61B 10/0058

FOREIGN PATENT DOCUMENTS

CN 223026358 U * 6/2025 ......... A61H 23/0254

OTHER PUBLICATIONS

CN223026358U Translation (Year: 2025).*

* cited by examiner

*Primary Examiner* — Thaddeus B Cox

(57) ABSTRACT

A male sexual stimulation device has an accommodating space extending along a longitudinal direction of the male sexual stimulation device for insertion of a male penis, the male sexual stimulation device includes a first massage component and a second massage component. The first massage component is drivable to slide in the longitudinal direction, and the first massage component defining a first cavity constituting a first part of the accommodating space. The second massage component is drivable to slide in the longitudinal direction, and the second massage component defining a second cavity constituting a second part of the accommodating space. The first and second massage components are arranged one after another in the longitudinal direction. Upon driven, the first massage component and second massage component slide towards or away from each other in the longitudinal direction.

16 Claims, 25 Drawing Sheets

MALE SEXUAL STIMULATION DEVICE

CROSS-REFERENCE TO RELATED APPLICATIONS

The present disclosure is a Continuation in Part of U.S. patent application Ser. No. 18/757,577, filed on Jun. 28, 2024 which claims the priority of Chinese Utility Model application No. 202421423057.8, filed on Jun. 20, 2024, and also claims priorities of Chinese Utility Model application No. 202422801719.7 filed on Nov. 15, 2024, and Chinese Utility Model application No. 202422801737.5 filed on Nov. 15, 2024, the entire contents of which are hereby incorporated by reference.

TECHNICAL FIELD

The present disclosure relates to the technical field of sexual stimulation, and in particular to a male sexual stimulation device.

BACKGROUND

With the improvement of living standards and the increase of pressure on people's life and work, male sexual stimulation devices, such as masturbators, are welcomed by more and more people. Most of the typical masturbators are equipped with vibration motors in their casings to stimulate the users' genitalia by means of high-frequency vibration for sexual pleasure. However, such male sexual stimulation devices usually provide monotonous stimulation effects, resulting in insufficient stimulation effects that are therefore unable to satisfy the users.

SUMMARY

An object of the present disclosure is to provide a male sexual stimulation device with a better stimulation effect to improve the users' sexual experience.

In order to achieve the above objective, a technical solution of the present disclosure provides a male sexual stimulation device having an accommodating space extending along a longitudinal direction thereof for insertion of a male penis, the male sexual stimulation device including:

- a first massage component that is drivable to slide in the longitudinal direction, the first massage component defining a first cavity constituting a first part of the accommodating space;
- a second massage component that is drivable to slide in the longitudinal direction, the second massage component defining a second cavity constituting a second part of the accommodating space,
- wherein the first massage component and the second massage components are arranged one after another in the longitudinal direction, and
- wherein upon driven, the first massage component and second massage component slide towards or away from each other in the longitudinal direction.

Another technical solution of the present disclosure provides a male sexual stimulation device, including:

- a transmission component;
- a first massage component in torque-transmission connection with the transmission component;
- a second massage component in torque-transmission connection with the transmission component;
- wherein the transmission component is configured to drive the first massage component and the second massage component to move towards or away from each other, the first massage component and the second massage component cooperatively defines a accommodating space for accommodating a male penis.

Compared with the prior art, the male sexual stimulation device provided by embodiments of the present disclosure has the following beneficial effects:

The male sexual stimulation device of the present disclosure is suitable for automatically massaging the genitalia, such as the penis, for providing an intense sexual stimulation to the penis. During use, the penis is inserted into the accommodating space constituted by the first and second massage components. With the reciprocating movements of the first massage component and the second massage component towards and away from each other, the first and second massage components cooperatively provide holding and pinching stimulation for penis, which improves the users' sexual experience.

BRIEF DESCRIPTION OF DRAWINGS

In order to more clearly illustrate the technical solutions of the embodiments of the present disclosure, the following provides a brief description of the drawings accompanying the embodiments. It should be noted that the drawings presented only show some embodiments of the present disclosure. Based on these drawings, those skilled in the art can obtain other drawings without any creative effort.

FIG. 1*l* is an exploded view of the male sexual stimulation device of FIG. 1*j*.

LIST OF REFERENCE SIGNS

Figure 1A:
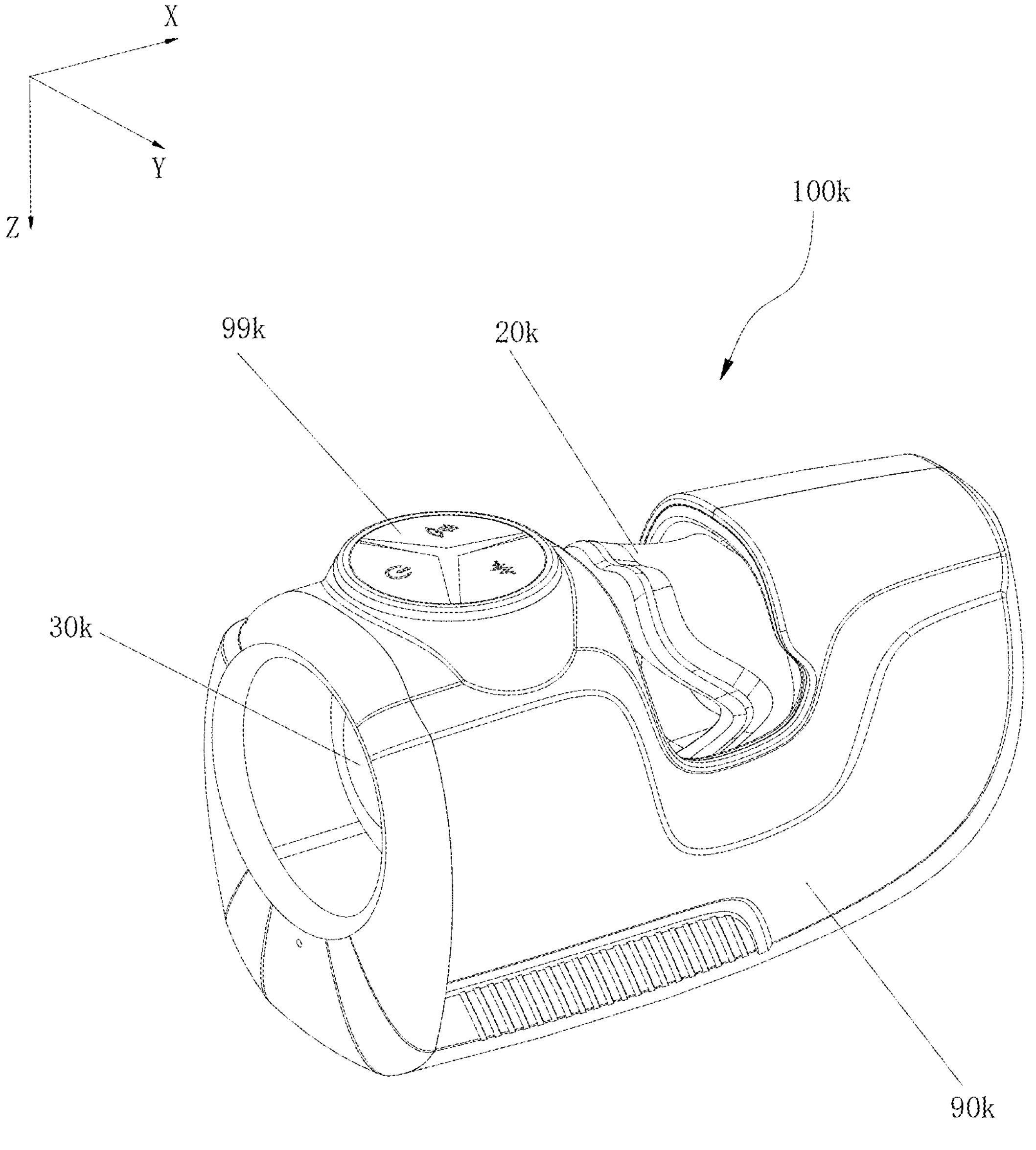
FIG. 1*a* is a schematic view of a male sexual stimulation device according to an embodiment of the present disclosure.
Figure 1B:
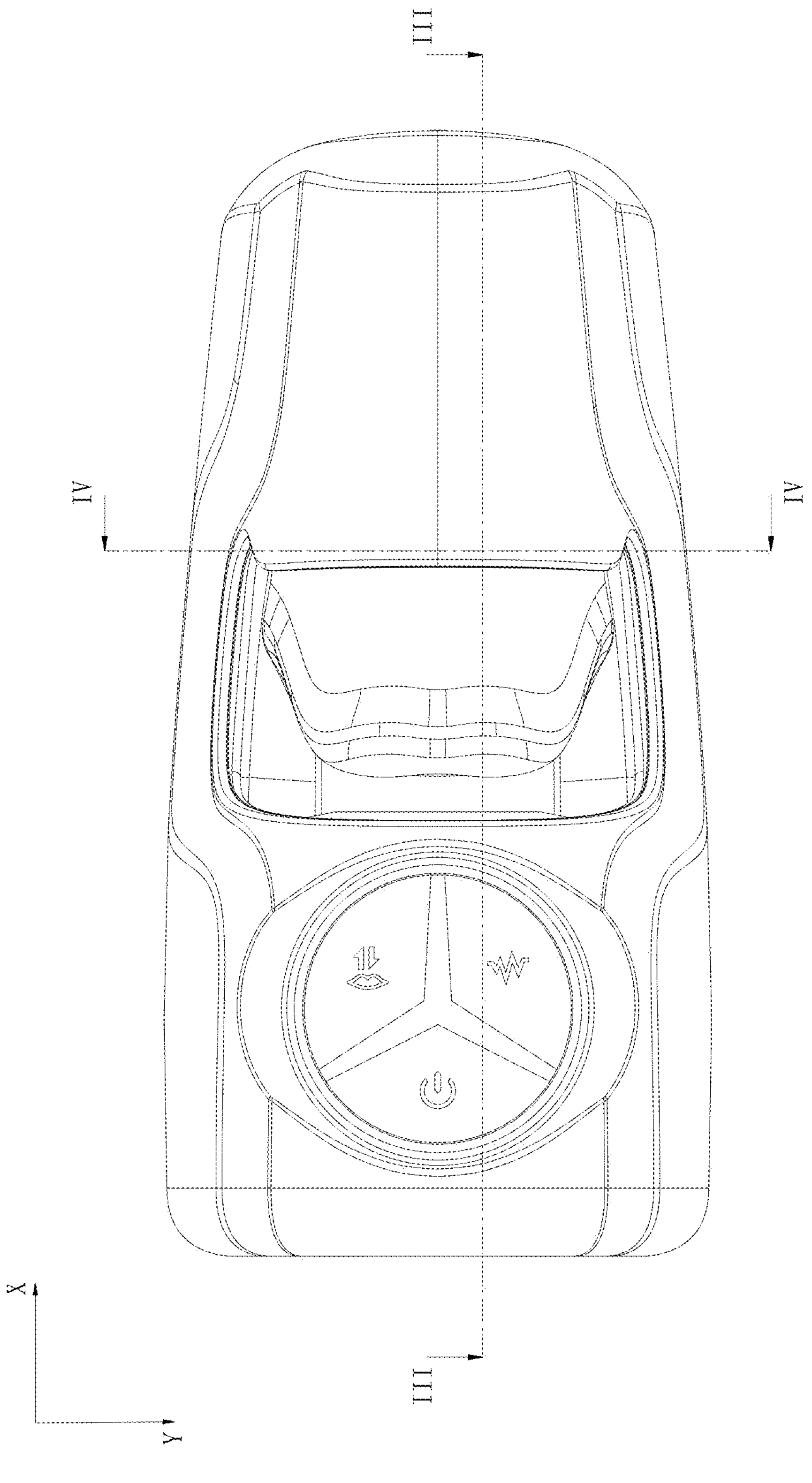
FIG. 1*b* is a top view of the male sexual stimulation device of FIG. 1*a*.

Male sexual stimulation device 100; accommodating space 10; first cavity 11; second cavity 12; third cavity 13; first massage component 20; first guide slider 21; first engagement groove 211; first flexible body 22; first support 23; first massage portion 24; second massage portion 25; second massage component 30; second guide slider 31; second engagement groove 311; second flexible body 32; second support 33; transmission component 40; first actuating element 41; second actuating element 42; guide rail 43; drive gear 44; first driven gear 45; first eccentric rod 451; second driven gear 46; second eccentric rod 461; first moving block 47; first rack 471; first threaded sleeve 472; second moving block 48; second rack 481; second threaded sleeve 482; transmission gear 49; rotating wheel 50; third eccentric rod 501; push-pull rod 51; elongated hole 511; first transmission rod 52; first gear portion 521; first threaded portion 522; first gear set 53; second transmission rod 54; second gear portion 541; second threaded portion 542; second gear set 55; first bevel gear 56; second bevel gear 57; actuator 60; first motor 61; second motor 62; pinch component 70; first swing rod 71; first swing arm 711; first guide arm 712; first tubular body 713; second swing rod 72; second swing arm 721; second guide arm 722; second tubular body 723; first actuating block 73; first inclined slot 731; second actuating block 74; second inclined slot 741; vibration component 80; circuit board 81; battery 82; housing 83.

DESCRIPTION OF EMBODIMENTS

For a better understanding of the present disclosure, embodiment(s) of the present disclosure will be described more comprehensively below with reference to the accompanied drawings. One or more embodiments of the present disclosure are illustrated in the drawings for a clearer understanding of the technical solutions. However, it should be noted that the present disclosure can be embodied in different forms and is not limited to the embodiment(s) described below.

The same or similar reference numbers in the drawings of the present disclosure correspond to the same or similar elements. It should be noted that the directional terms such as 'upper', 'lower', 'left', and 'right' used in the description of the present disclosure are based on the orientation or positional relationship shown in the drawings, solely for the convenience of description and simplification, and do not indicate or imply that the device or element must have a specific orientation or be constructed or operated in a specific orientation. Therefore, the terms describing the positional relationship in the drawings are only used for illustrative purposes and should not be construed as limitations of the present disclosure. Those skilled in the art can understand the specific meanings of these terms according to specific circumstances.

Moreover, the terms such as 'first', 'second', etc., used in the embodiments of the present disclosure are solely for descriptive purposes and should not be construed as indicating or implying relative importance or the number of the technical features referred to. Therefore, the features defined by 'first' and 'second' may refer to at least one of such features. Furthermore, the expression 'and/or' as used in this description encompasses three possibilities. Taking 'A and/or B' as an example, it includes A alone, B alone, or both A and B together.

Furthermore, the technical solutions of different embodiments may be combined, as long as the combined technical solution is feasible for those skilled in the art. If the technical solutions to be combined are contradictory or cannot be implemented, such a combination should be considered non-existent and outside the protection scope of the present disclosure.

Referring to FIGS. 1*a*-1*e*, a male sexual stimulation device according to an embodiment of the present disclosure is shown. In this embodiment, the male sexual stimulation device 100*k* includes a first stimulation member 20*k*, a second stimulation member 30*k*, and a driving assembly.

Figure 1C:
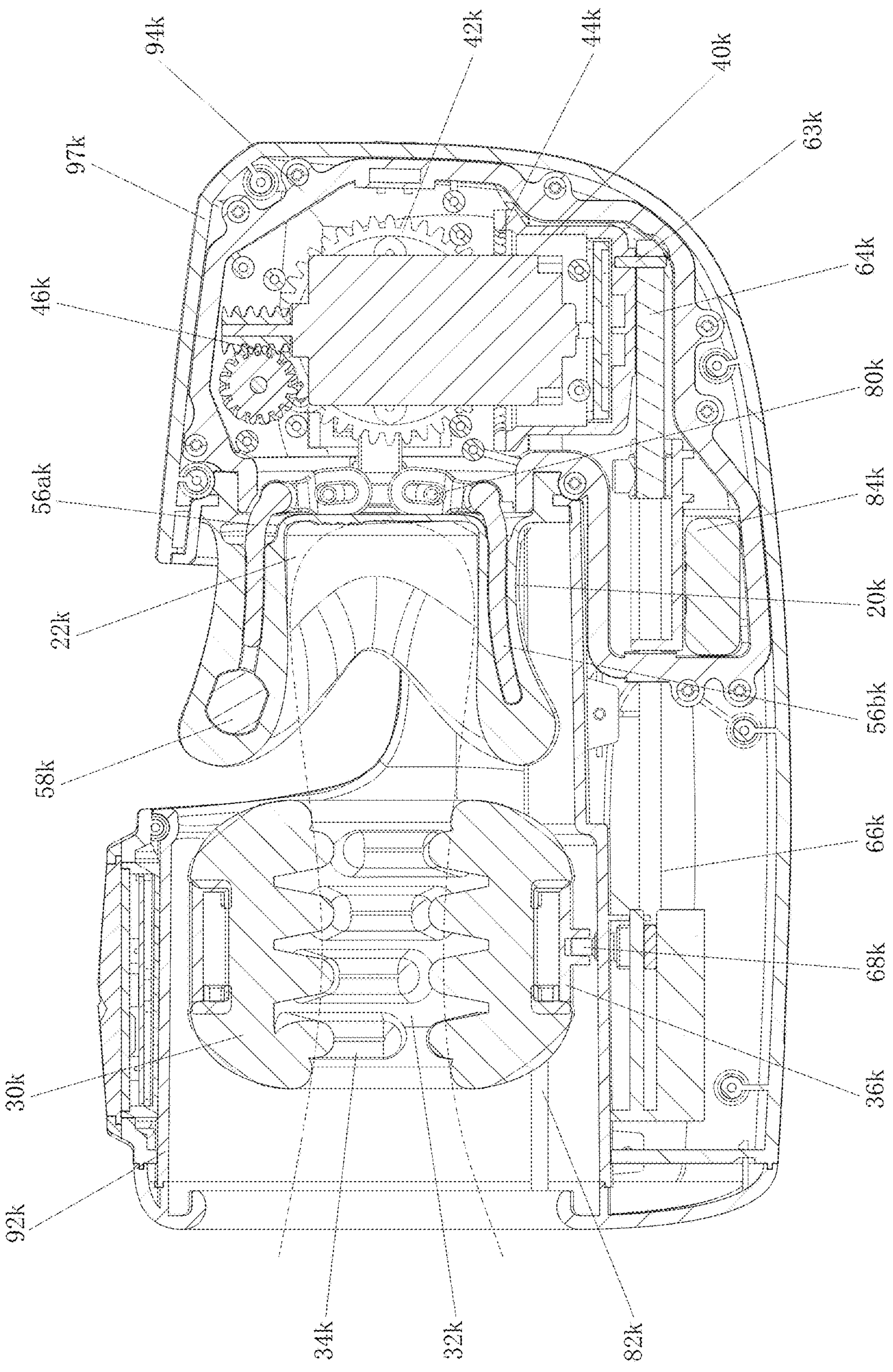
FIG. 1*c* is a cross sectional view of the male sexual stimulation device taken along line III-III of FIG. 1*b*.
Figure 1D:
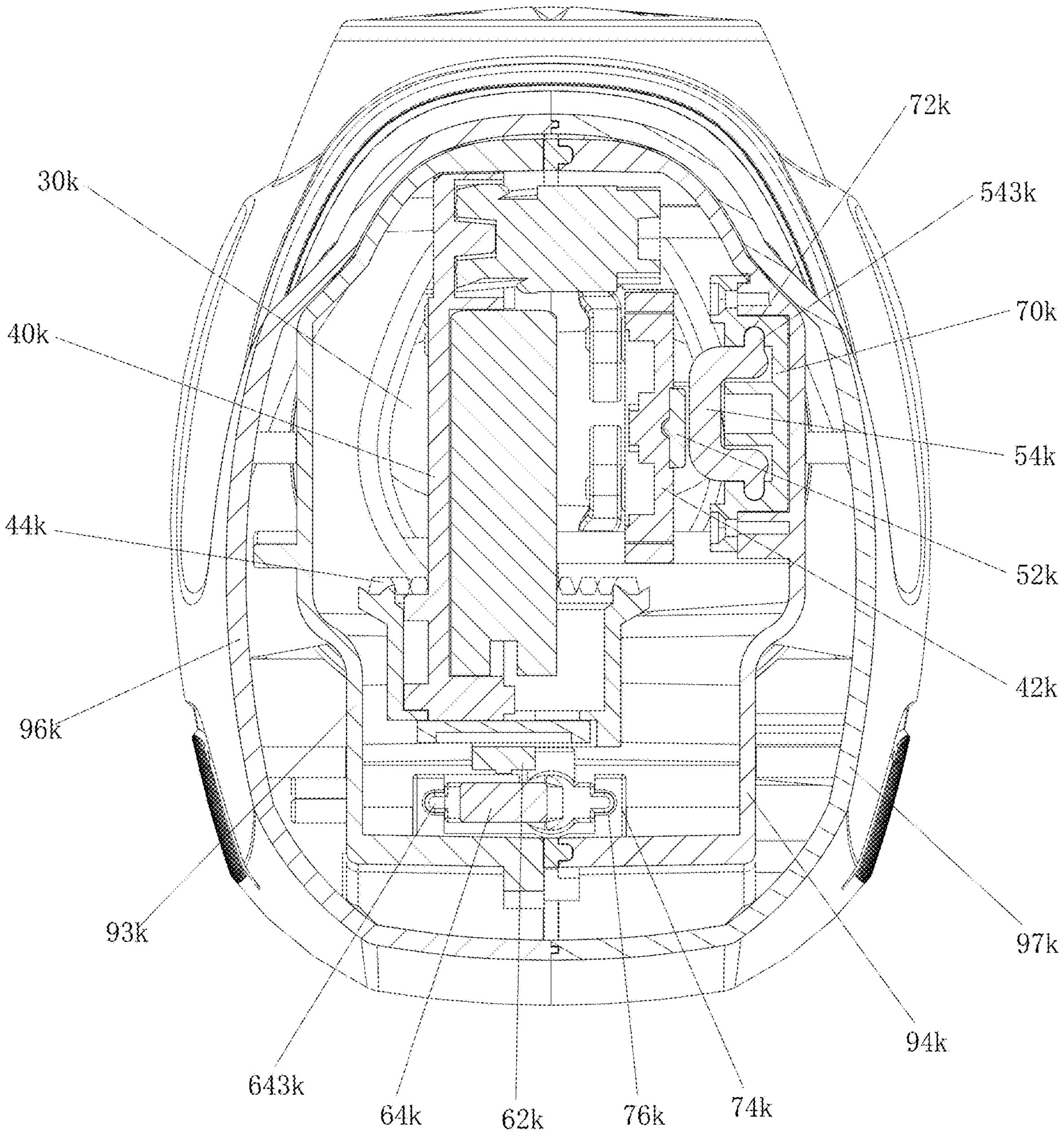
FIG. 1*d* is a cross sectional view of the male sexual stimulation device taken along line IV-IV of FIG. 1*b*.
Figure 1E:
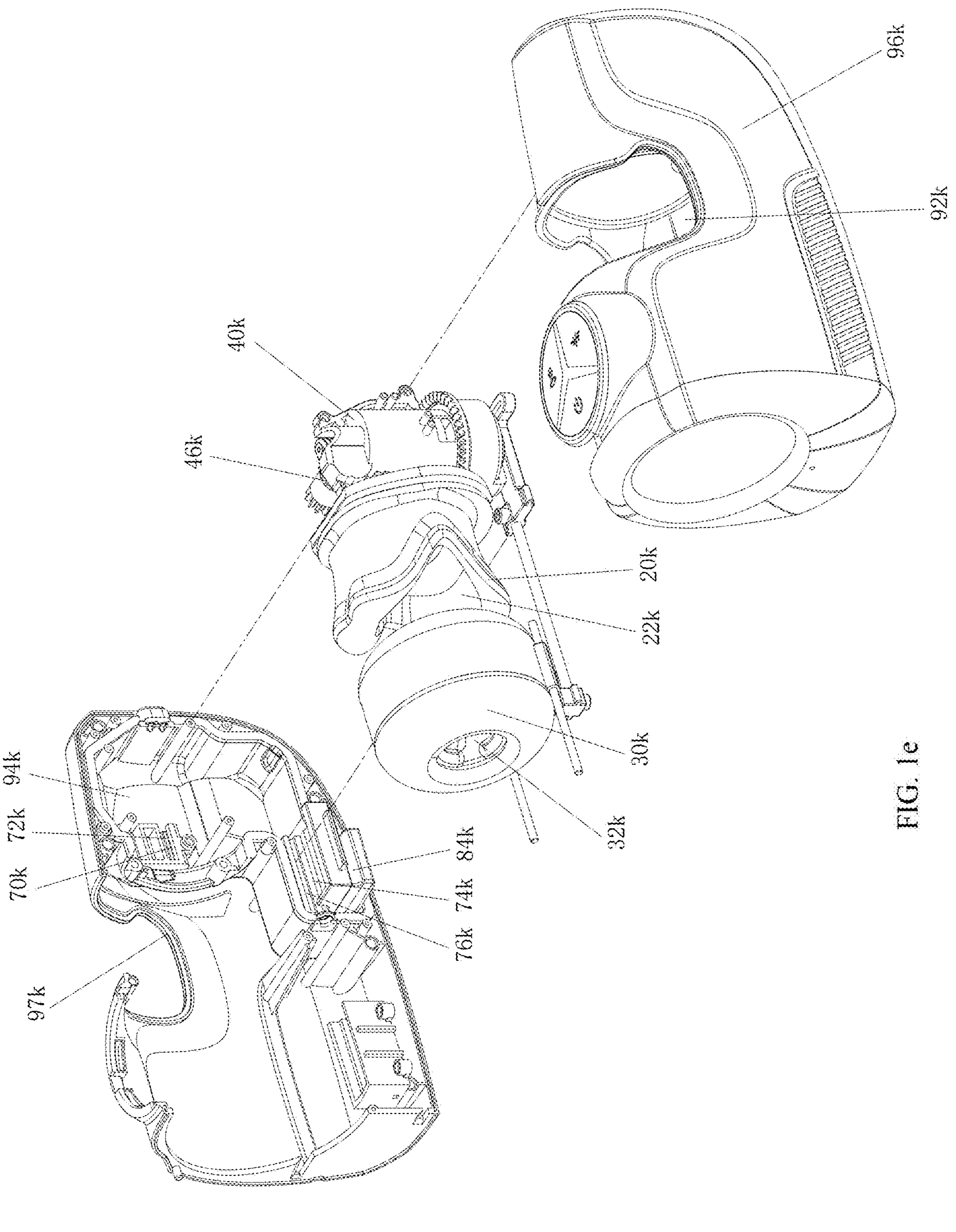
FIG. 1*e* is an exploded view of the male sexual stimulation device of FIG. 1*a*.

As shown in FIG. 1*c* and FIG. 1*e*, the first stimulation member 20*k* defines a first chamber 22*k* therein, and the second stimulation member 30*k* defines a second chamber 32*k* therein. The first chamber 22*k* and the second chamber 32*k* are arranged in sequence along an axial direction of the male sexual stimulation device 100*k*, communicating with each other and cooperatively forming an accommodating chamber. The accommodating chamber is elongated and generally column-shaped, and configured with a shape and a size being suitable for accommodating a male genitalia therein.

During use, as shown in FIG. 1*c*, the male genitalia is inserted into the accommodating chamber of the device 100*k*. Under the action of the driving assembly, the first stimulation member 20*k* generates a first motion, such as clamping and kneading; and, the second stimulation member 30*k* generates a different second motion, such as linear movement, rotation, vibration, and etc. The first and second stimulation members 20*k*, 30*k* simultaneously stimulate the male genitalia in different manners, thus the user is more likely to reach orgasm with the help of the present device 100*k*.

The first and second stimulation members 20*k*, 30*k* are both made of soft materials, such as silicone, which have a soft touch and a certain elastic buffering effect, making the users feel more comfortable. In this embodiment, the second stimulation member 30*k* is hollow and cylindrical-shaped, and the second chamber 32*k* extends through two axial ends of the second stimulation member 30*k*. When the device 100*k* is in use, the male genitalia is inserted into the second chamber 32*k* through an end of the second stimulation member 30*k* away from the first stimulation member 20*k*. A front end of the male genitalia, i.e. the glans, passes through the second chamber 32*k* and extends into the first chamber 22*k* of the first stimulation member 20*k*. Preferably, an end of the first stimulation member 20*k* away from the second stimulation member 30*k* is closed, enclosing the glans of the male genitalia that extends into the first chamber 22*k*.

As shown in FIG. 1*c*, in this embodiment, the first and second stimulation members 20*k*, 30*k* are separated from each other in the axial direction, with a gap defined therebetween, so that the first and second stimulation members 20*k*, 30*k* do not interfere with each other during movement. In some embodiments, elastic structures such as elastic sheets, elastic strips, etc. may be provided between the first and second stimulation members 20*k*, 30*k*, as long as they do not affect their movement, especially not affect telescopic movement of the second stimulation member 30*k*. Preferably, the elastic structure is integrally formed with the first and second stimulation members 20*k*, 30*k* through injection molding.

Figure 1F:
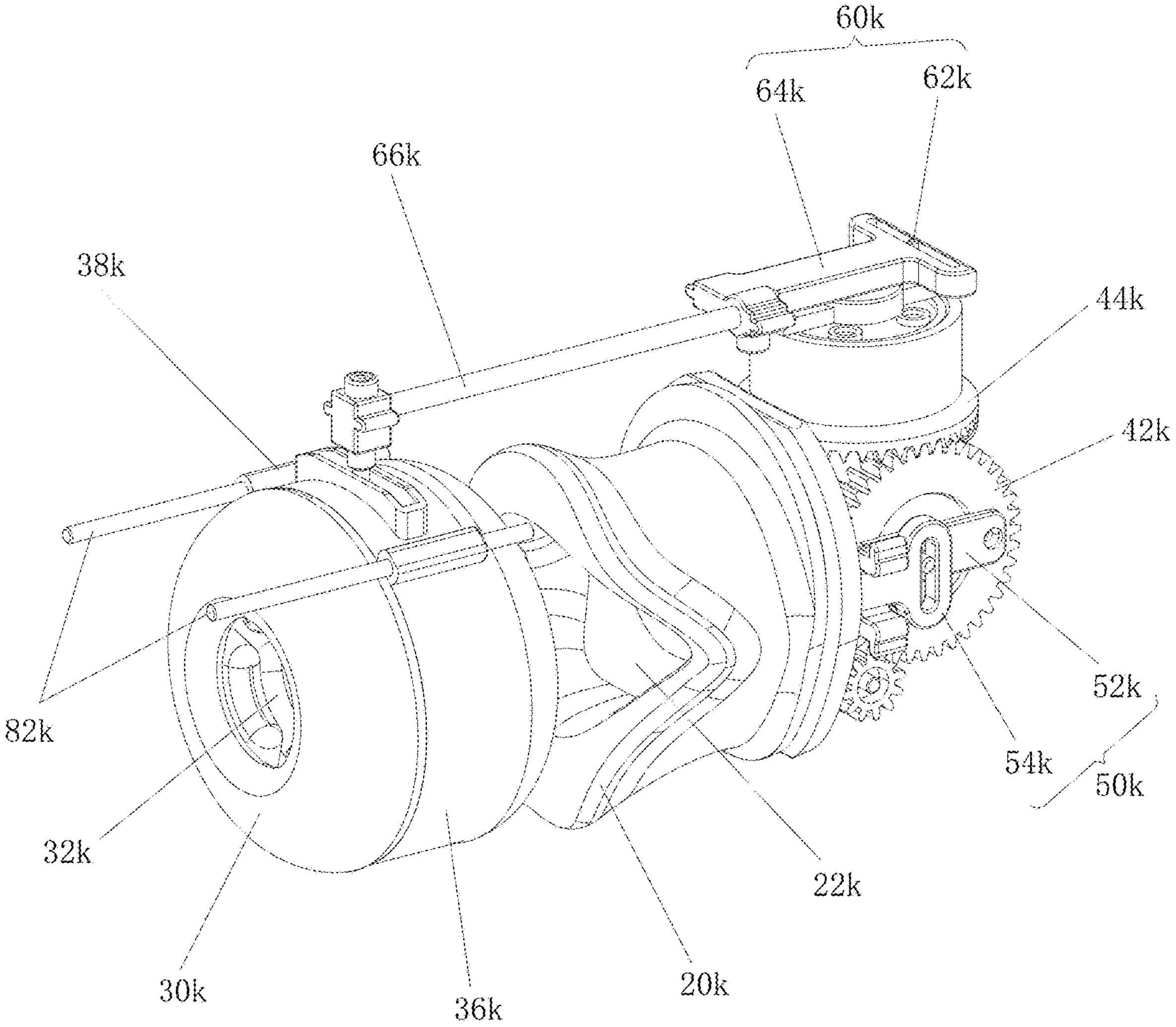
FIG. 1*f* shows the male sexual stimulation device of FIG. 1*a* from another aspect, wherein a shell of the device is removed.
Figure 1G:
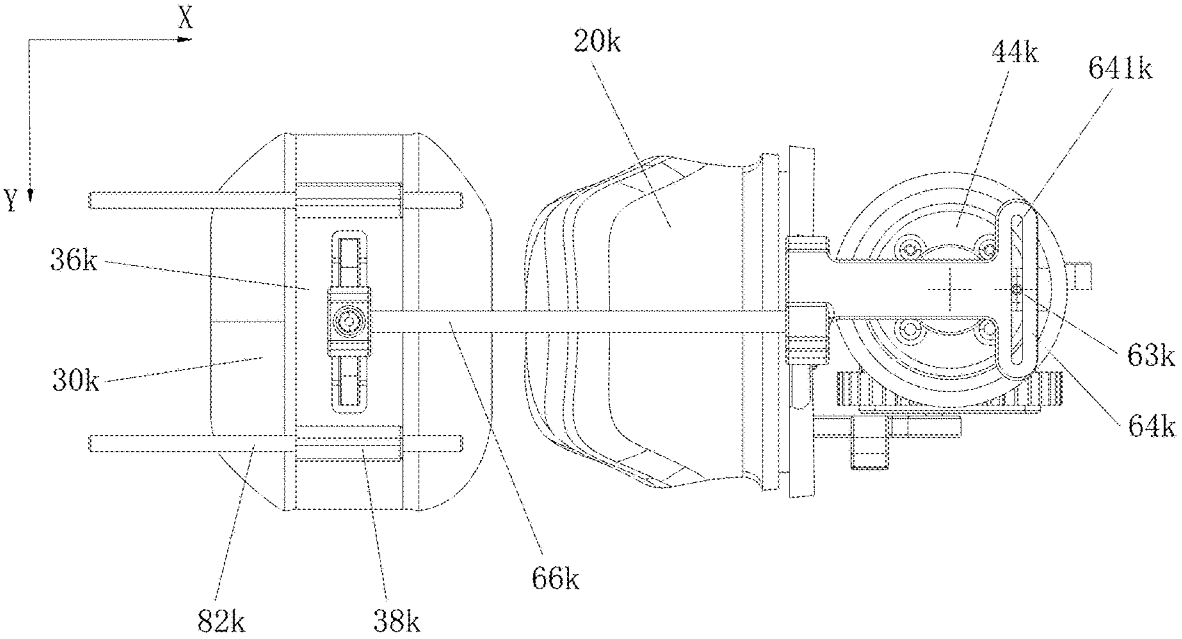
FIG. 1*g* is a top view of FIG. 1*f*.
Figure 1H:
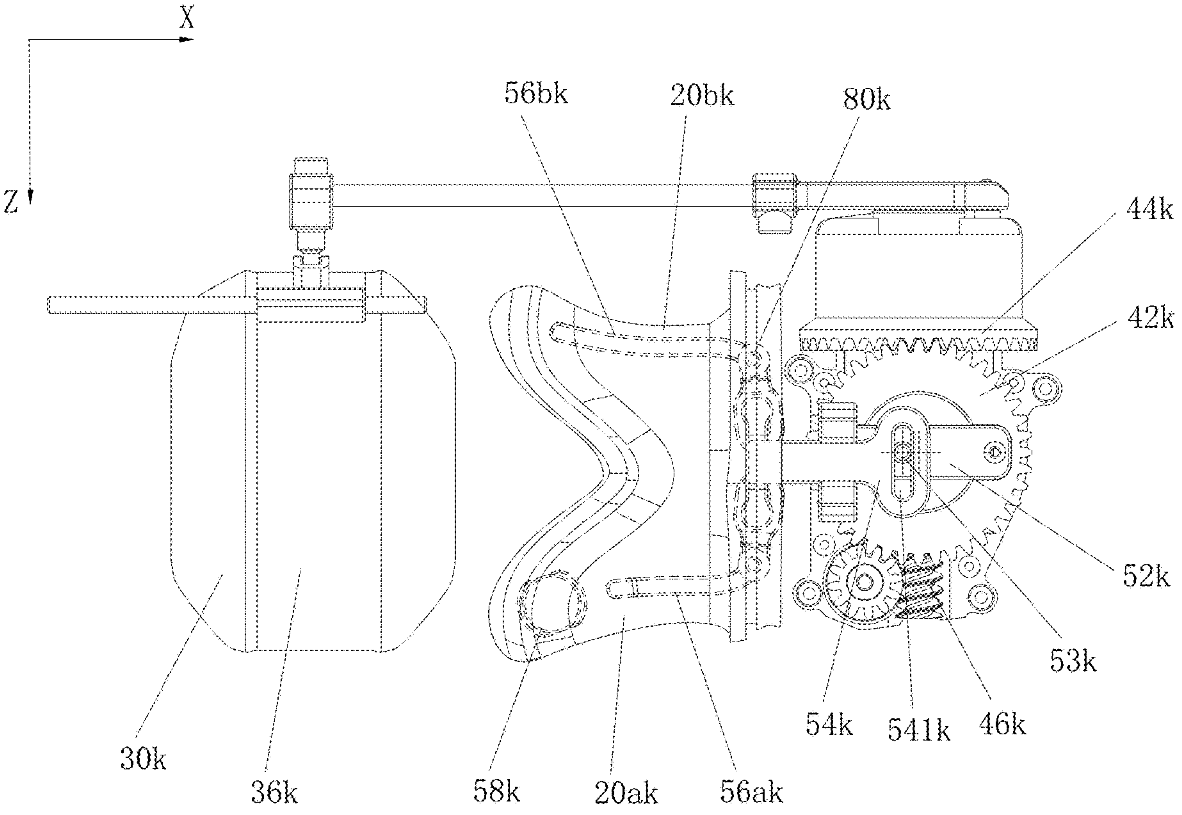
FIG. 1*h* is a side view of FIG. 1*f*.
Figure 1I:
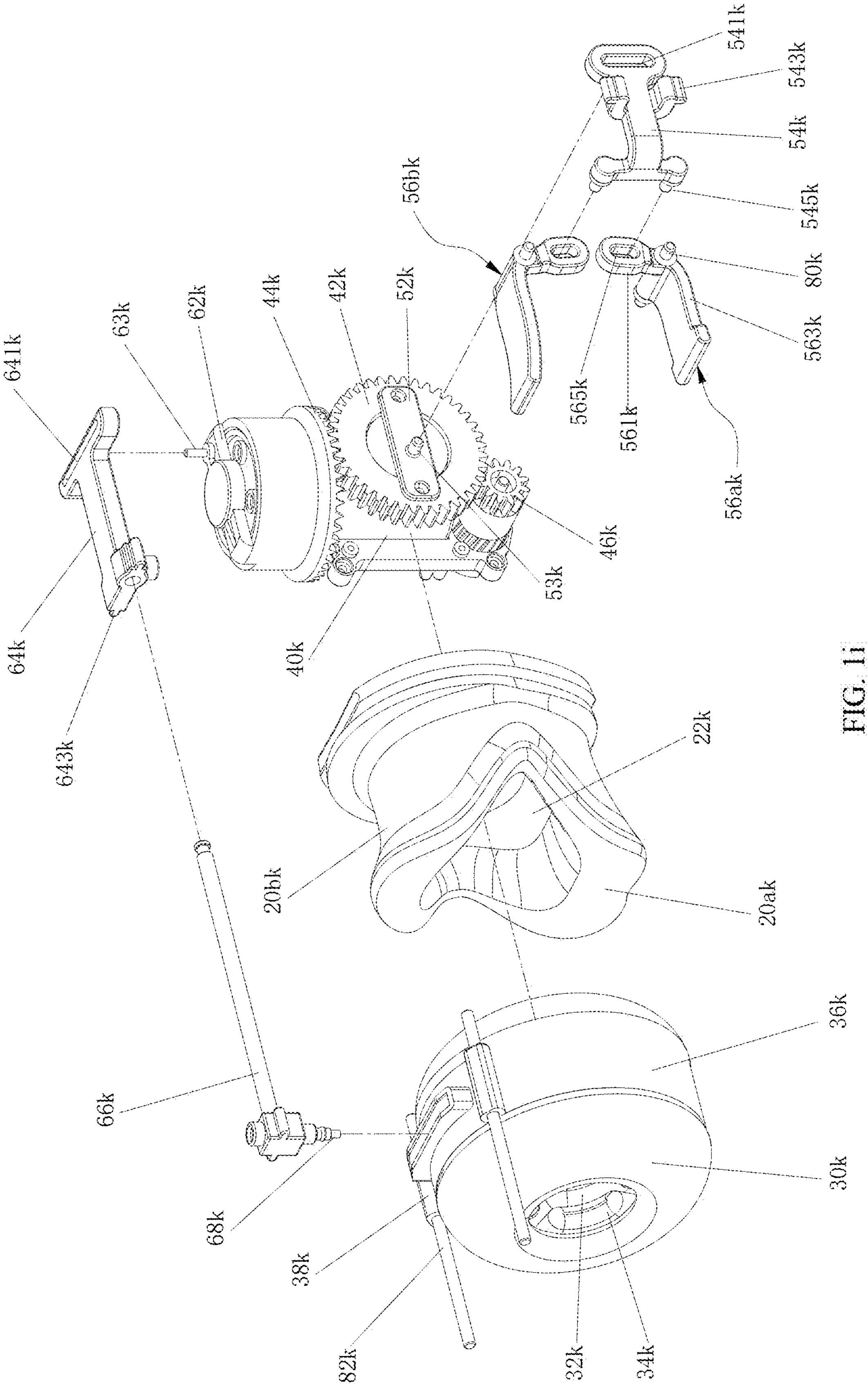
FIG. 1*i* is a further exploded view of FIG. 1*f*.
Figure 1J:
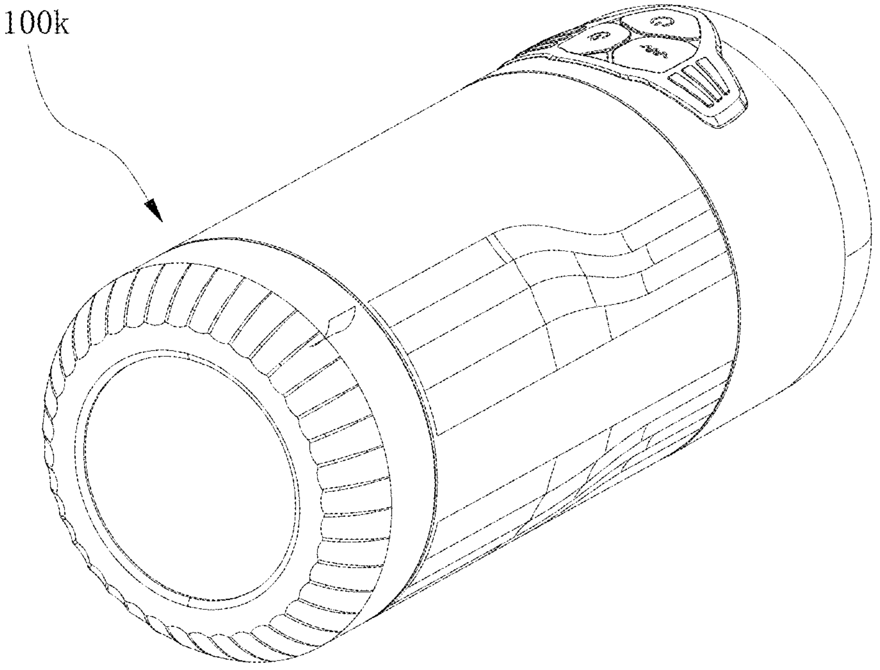
FIG. 1*j* is a schematic view of a male sexual stimulation device according to another embodiment of the present disclosure.
Figure 1K:
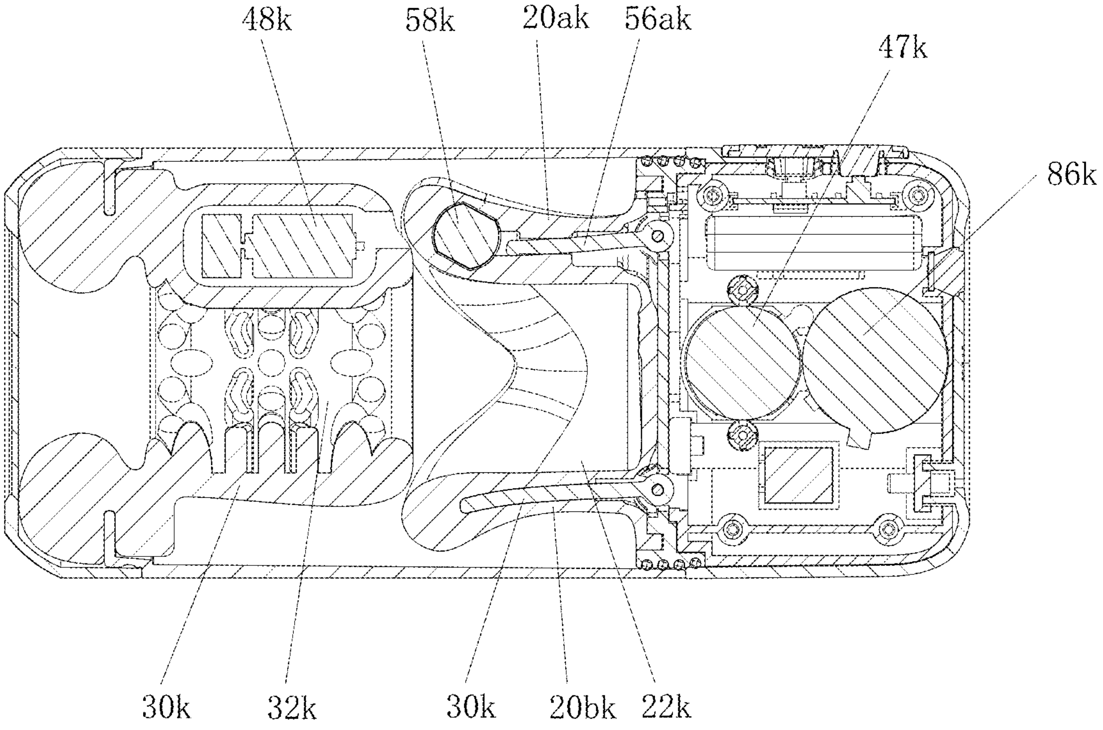
FIG. 1*k* is a cross sectional view of the male sexual stimulation device of FIG. 1*j*.

As shown in FIG. 1*i*, in this embodiment, the first stimulation member 20*k* is generally mouth-like, and includes a first stimulation portion 20*ak* and a second stimulation portion 20*bk* which are opposite to each other, and the first chamber 22*k* is defined between the first stimulation portion 20*ak* and the second stimulation portion 20*bk*. Under the action of the driving assembly, the first stimulation portion 20*ak* and the second stimulation portion 20*bk* swing towards or away from each other, clamping and kneading the glans of the male genitalia accommodated in the first chamber 22*k*. In the illustrated embodiment, the first stimulation portion 20*ak* and the second stimulation portion 20*bk* may be connected with each other in a circumferential direction, so that the first stimulation member 20*k* in whole is annular and can more tightly enclose the glans of the male genitalia.

Preferably, the first stimulation member 20*k* is concave at a connection point of the first stimulation portion 20*ak* and the second stimulation portion 20*bk*, so that the swinging of the first stimulation portion 20*ak* and second stimulation portion 20*bk* will not affect each other. In some embodiments, the first stimulation portion 20*ak* and the second stimulation portion 20*bk* may be separated in the circumferential direction, which is not limited to specific embodiments.

As shown in FIGS. 1*f*-1*i*, the driving assembly includes a driving source and swinging arms. In this embodiment, the swinging arms includes a first swinging arm 56*ak* engaged with the first stimulation portion 20*ak*, and a second swinging arm 56*bk* engaged with the second stimulation portion 20*bk*.

The driving source preferably is a gear motor, and includes a driving motor 40*k* and first and second output wheels 42*k*, 44*k* driven by the motor 40*k* to rotate with a speed about of 1000*k* rpm. The first output wheel 42*k* is connected to the first and second swinging arms 56*ak* through a first transmission unit 50*k*, so as to drive the first stimulation portion 20*ak* and the second stimulation portion 20*bk* of the first stimulation member 20*k* to swing relative to each other. The second output wheel 44*k* is connected to the second stimulation member 30*k* through a second transmission unit 60*k*, so as to drive the second stimulation member 30*k* to do reciprocating movement in the axial direction.

As shown in FIG. 1*f* and FIG. 1*i*, the first transmission unit 50*k* includes a first transmission member 52*k* and a first sliding member 54*k*.

The first transmission member 52*k* is connected to the first output wheel 42*k*, including a first transmission shaft 53*k* that is eccentrically set relative to a rotary axis of the first output wheel 42*k*. When the first output wheel 42*k* rotates, the first transmission shaft 53*k* revolves around the rotary axis of the first output wheel 42*k*. Referring to FIG. 8*k*, the rotary axis of the first output wheel 42*k* extends along the Y direction, and the first transmission shaft 53*k* rotates in the XZ plane, generating displacements in both the X direction and the Z direction.

The first sliding member 54*k* is provided with a first sliding groove 541*k*, and the first transmission shaft 53*k* is slidably inserted into the first sliding groove 541*k*. The first sliding groove 541*k* is elongated, with a width in the X direction substantially equivalent to the diameter of the first transmission shaft 53*k* and a length in the Z direction much greater than the diameter of the first transmission shaft 53*k*. In this way, the movement of the first transmission shaft 53*k* in the X direction causes the first sliding member 54*k* to move together in the X direction; while the movement of the first transmission shaft 53*k* in the Z direction is converted into the sliding of the first transmission shaft 53*k* along the first sliding groove 541*k* relative to the first sliding member 54*k*.

By means of cooperation of the first transmission shaft 53*k* and the first sliding groove 541*k*, the rotation of the first transmission member 52*k* in the XZ plane is converted into a linear reciprocating movement of the first sliding member 54*k* in the X direction. Preferably, as shown in FIG. 1*d* and FIG. 1*i*, the first sliding member 54*k* protrudes outwardly to form a first guide block 543*k*, and a first guide member 70*k* with an elongated first guide groove 72*k* is provided and fixed inside the device 100*k*. After assembly, the first guide block 543*k* of the first sliding member 54*k* is slidably engaged into the first guide groove 72*k* of the first guide member 70*k*, guiding the movement of the first sliding member 54*k* in the X direction.

The first swinging arm 56*ak* and the second swinging arm 56*bk* are generally the same in construction and arranged opposite to each other. Each of the first and second swinging arms 56*ak*, 56*bk* includes a connecting section 561*k* and a swinging section 563*k*. The connecting sections 561*k* of the two swinging arms 56*ak*, 56*bk* are movably connected to the first sliding member 54*k*, and the swinging sections 563*k* of the two swinging arms 56*ak*, 56*bk* extend into the first stimulation portion 20*ak* and the second stimulation portion 20*bk* of the first stimulation member 20*k*, respectively.

Preferably, the first swinging arm 56*ak* and the second swinging arm 56*bk* are made of hard materials, such as plastic, metal and etc., which can better transmit the force to the first stimulation portion 20*k* and the second stimulation portion 20*bk*. Preferably, during the process of forming the first stimulation member 20*k*, the swinging section 563*k* of the first swinging arm 56*ak* is fixed integrally into the first stimulation portion 20*ak*, and the swinging section 563*k* of the second swinging arm 56*bk* is fixed integrally into the second stimulation portion 20*bk*.

In this embodiment, the connecting section 561*k* and swinging section 563*k* of each of the two swinging arms 56*ak*, 56*bk* are angled with each other, and a pivot 80*k* is provided at a connection of the connecting section 561*k* and swinging section 563*k* of each of the two swinging arms 56*ak*, 56*bk*. The two pivots 80*k* are arranged in parallel intervals, and extend along the Y direction that is perpendicular to the telescopic movement direction (i.e., the X direction) of the first sliding member 54*k*. By means of the pivots 80*k*, the two swinging arms 56*ak*, 56*bk* can be rotatably set into the device 100*k*. In some embodiments, the pivots 80*k* are fixed in the device 100*k*, and each swinging arm 56*ak*, 56*bk* is rotatably mounted around a corresponding pivot 80*k*. In some embodiments, each swinging arm 56*ak*, 56*bk* may be fixedly connected to the corresponding pivot 80*k*, and the pivots 80*k* are rotatably set in the device 100*k*.

When the first sliding member 54*k* moves in the X direction, the connecting sections 561*k* of the two swinging arms 56*ak*, 56*bk* move along with the first sliding member 54*k*, causing the two swinging arms 56*ak*, 56*bk* to rotate around their respective axis rods 80*k*, thereby causing the swinging sections 563*k* of the two swinging arms 56*ak*, 56*bk* to swing towards or away from each other, finally driving the first stimulation portion 20*ak* and the second stimulation portion 20*bk* to swing towards/away from a central portion of the first chamber 22*k* synchronously. When the first stimulation portion 20*ak* and the second stimulation portion 20*bk* swing towards each other, the first stimulation member 20*k* is closed to clamp the male genitalia; and, when the first stimulation portion 20*ak* and the second stimulation portion 20*bk* swing away from each other, the first stimulation member 20*k* is opened to release the male genitalia. Compared to existing devices, the first stimulation member 20*k*, which clamps and kneads the male genitalia, especially the glans of the male genitalia, provides more effective stimulation, so that the user is more likely to reach orgasm.

As shown in FIG. 1*i*, the first sliding groove 541*k* is provided at one end of the first sliding member 54*k*, and the other end of the first sliding member 54*k* protrudes outwardly to form a connecting portion 545*k*. The connecting section 561*k* of each swinging arm 56*ak*, 56*bk* defines a connecting hole 565*k* therein, and the connecting portion 545*k* is movably inserted into the connecting holes 565*k* of the swinging arms 56*ak*, 56*bk*. When the first sliding member 54*k* moves in the X direction, the connecting portion 545*k* can move and rotate in the connecting holes 565*k* of the swinging arms 56*ak*, 56*bk*, thereby allowing the swinging arms 56*ak*, 56*bk* to rotate about the corresponding pivot 80*k*. In this embodiment, the first sliding member 54*k* is provided with two connecting portions 545*k*, each of which is inserted into the connecting hole 565*k* of one of the two swinging arms 56*ak*, 56*bk*.

In some embodiments, one of the first swinging arm 56*ak* and the second swinging arm 56*bk* may be fixed, for example, the first swinging arm 56*ak* may be fixed inside the device 100*k*, and the second swinging arm 56*bk* may be rotatably mounted inside the device 100*k* through the pivot 80*k*. In this situation, the first sliding member 54*k* is connected to the connecting section 561*k* of the second swinging arm 56*bk*, allowing the second swinging arm 56*bk* to rotate about the pivot 80*k*, thereby enabling the swinging section 563*k* of the second swinging arm 56*bk* to swing relative to the first swinging arm 56*ak*. In this way, the first stimulation portion 20*ak* of the first stimulation member 20*k* remains stationary, and the second stimulation portion 20*bk* swings back and forth relative to the first stimulation portion 20*ak* under the driving of the second swinging arm 56*bk*, which may also produce a clamping and kneading stimulation effect to the male genitalia that extends into the first chamber 22*k*.

In some embodiments, a vibration motor 58*k* may be provided in the first stimulation portion 20*ak* and/or second stimulation portion 20*bk* of the first stimulation member 20*k* (referring to FIG. 1*c*), so that the first stimulation member 20*k* can further stimulate the male genitalia through vibration, further improving the stimulation effect.

As shown in FIG. 1*f* and FIG. 1*i*, the second transmission unit 60*k* includes a second transmission member 62*k* and a second sliding member 64*k*.

The second transmission member 62*k* is connected to the second output wheel 44*k*, and includes a second transmission shaft 63*k* that is set eccentrically relative to a rotary axis of the second output wheel 44*k*. When the second output wheel 44*k* rotates, the second transmission shaft 63*k* revolves around the rotary axis of the second output wheel 44*k*. Referring to FIG. 7*k*, the rotary axis of the second output wheel 44*k* extends along the Z direction, and the second transmission shaft 63*k* rotates in the XY plane, generating displacements in both the X direction and the Y direction.

The second sliding member 64*k* is provided with a second sliding groove 641*k*, and the second transmission shaft 63*k* is movably inserted into the second sliding groove 641*k*. The second sliding groove 641*k* is elongated, with a width in the X direction substantially equivalent to the diameter of the second transmission shaft 63*k* and a length in the Y direction much greater than the diameter of the second transmission shaft 63*k*. In this way, the movement of the second transmission shaft 63*k* in the X direction causes the second sliding member 64*k* to move together in the X direction; and, the movement of the second transmission shaft 63*k* in the Y direction is converted into the sliding of the second transmission shaft 63*k* along the second sliding groove 641*k* relative to the second sliding member 64*k*.

By means of cooperation of the second transmission shaft 63*k* and the second sliding groove 641*k*, the rotation of the second transmission member 62*k* in the XY plane is converted into linear reciprocating motion of the second sliding member 64*k* in the X direction. Preferably, as shown in FIG. 1*e* and FIG. 1*i*, the second sliding member 64*k* protrudes outwardly to form a second guide block 643*k*, and the device 100*k* is fixedly provided with a second guide member 74*k*, and a second guide member 74*k* with an elongated second guide groove 76*k* is fixed inside the device 100*k*. The second guide block 643*k* of the second sliding member 64*k* is engaged into the second guide groove 76*k* of the second guiding member 74*k*, guiding the movement of the second sliding member 64*k* in the X direction.

In the illustrated embodiment, the second transmission unit 60*k* is set at an end of the first stimulation member 20*k* away from the second stimulation member 30*k*. There is a large distance between the second sliding member 64*k* and the second stimulation member 30*k*, and a connecting rod 66*k* is provided therebetween to achieve long-distance power transmission, so that the second sliding member 64*k* can drive the second stimulation member 30*k* to move back and forth in the X direction, stimulating a portion of the male genitalia, such as a rear end of the male genitalia, in the second chamber 32*k*. It should be understood that, according to the position of the second sliding member 64*k* and the second stimulation member 30*k* inside the device 100*k*, the connecting rod 66*k* may be single or multiple. In some embodiments, when the positions of the second sliding member 64*k* and the second stimulating member 30*k* are close to each other, the connecting rod 66*k* may be omitted.

As shown in FIG. 1*c* and FIG. 1*i*, a plurality of protrusions 34*k* extends inwardly from an inner circumferential surface of the second stimulation member 30*k* towards the second chamber 32*k*. The protrusions 34*k* may be convex points, convex pillars, convex strips, convex ribs, etc., which compresses the male genitalia in the second chamber 32*k*, further enhancing the stimulation effect of the second stimulation member 30*k*.

As shown in FIG. 1*c* and FIG. 1*i*, an outer circumferential surface of the second stimulation member 30*k* is concaved to form an annular groove, in which a fixing ring 36*k* is accommodated. The fixing ring 36*k* may be made of hard material and used for connecting the second stimulation member 30*k* to the second transmission unit 60*k*. Preferably, the fixing ring 36*k* is integrally fixed onto the second stimulation member 30*k* during the injection molding process of the second stimulation member 30*k*.

As shown in FIG. 1*f* and FIG. 1*i*, an outer wall of the fixing ring 36*k* protrudes to form a guide portion 38*k*, in which a guide rod 82*k* is movably inserted. The guide rod 82*k* is fixed in the device 100*k* and extends along the X direction, so as to guide the movement of the second stimulation member 30*k* in the X direction. The guide portion 38*k* and the guide rod 82*k* are preferably multiple, so that the force on the second stimulation member 30*k* is more balanced, and thus the movement of the second stimulation member 30*ki* s more stable.

Specifically, the first guide member 70*k*, the second guide member 74*k*, the pivots 80*k*, the guide rods 82*k*, and the like may be fixed in a shell 90*k* of the device 100*k*. As shown in FIG. 1*e*, the shell 90*k* includes an inner shell and an outer shell that encloses the inner shell, wherein the inner shell includes a first inner shell 92*k*, a second inner shell 93*k*, and a third inner shell 94*k*, and the outer shell includes a first shell 96*k* and a second shell 97*k*.

The first inner shell 92*k* is generally cylindrical-shaped, with a first space therein for mounting the first and second stimulation members 20*k*, 30*k*. The second inner shell 93*k* and the second inner shell 93*k* are connected to each other by, for example, snap-fitting, and a second space is formed therebetween for mounting the transmission unit. Preferably, as shown in FIG. 1*c*, a structure formed by the second inner shell 93*k* and the second inner shell 93*k* has an open end at a side thereof facing the first stimulation member 20*k*, and a close end of the first stimulation member 20*k* covers and seals the open end.

The first shell 96*k* and the second shell 97*k*, which may be connected through snap-fitting, cooperatively form the outer shell of the device 100*k*. Preferably, the outer shell and the first inner shell 92*k* are spaced from each other in the radial direction, thereby forming a space therebetween for extending of the connecting rod 66*k* therethrough to connecting the second stimulation member 30*k* to the second transmission unit 60*k*. In the illustrated embodiment, an end of the connecting rod 66*k* is provided with a pin 68*k*, and the first inner shell 92*k* forms a slot which is elongated in the X direction. During assembly, the pin 68*k* extends through the slot into the first inner shell 92*k* to connect the fixing ring 36*k*.

As shown in FIG. 1*c* and FIG. 1*e*, the shell 90*k* is further equipped with a battery 84*k*, a circuit board, and etc. The battery 84*k* is electrically connected to electronic components inside the device 100*k*, such as the driving motor 40*k*, the vibration motor 58*k*, etc., through the circuit board. Control buttons 99*k* are provided on the shell 90*k*, through which the operation of the device 100*k*, such as the rotary speed and direction of the driving motor 40*k*, the vibration frequency of the vibration motor 58*k*, and etc., can be controlled, so that the first and second stimulation members 20*k*, 30*k* can provide different degrees of stimulation according to user needs.

In this embodiment, the first output wheel 42*k* and the second output wheel 44*k* are both gears and mesh with each other. The rotary axis of the first output wheel 42*k* is perpendicular to the rotary axis of the second output wheel 44*k*, so that the first transmission component 50*k* and the second transmission unit 60*k* can be arranged at different sides of the device 100*k*, fully utilizing the internal space of the device 100*k* and making the product size controllable. In addition, meshing of the first output wheel 42*k* and the second output wheel 44*k* allows the first and second stimulation members 20*k*, 30*k* both to be driven by the same motor 40*k*, further simplifying the structure and saving costs.

In the illustrated embodiment, a transmission component 46*k*, such as a worm gear, is provided between the driving motor 40*k* and the first output wheel 42*k*, the second output wheel 44*k*, which can not only transmit the torque from the driving motor 40*k* to the first output wheel 42*k* and the second output wheel 44*k*, but also change the direction of torque transmission as needed. In some embodiments, other transmission units, such as bevel gears, planetary gears, pulleys, etc., or a combination of multiple transmission units, may be provided between the driving motor 42*k* and the first and second output wheels 42*k*, 44*k*.

In addition, in some embodiments, the driving assembly may include multiple driving motors, wherein the first output wheel 42*k* and the second output wheel 44*k* are separated from each other and connected to different driving motors, so that the movement of the first and second stimulation members 20*k*, 30*k* can be controlled separately.

Referring to FIGS. 1*j*-1*m*, a male sexual stimulation device according to another embodiment of the present disclosure is shown. In this embodiment, the male sexual stimulation device 100*k* includes a first stimulation member 20*k*, a second stimulation member 30*k*, and a driving assembly. A first chamber 22*k* is defined in the first stimulation member 20*k*, and a second chamber 32*k* is defined in the second stimulation member 30*k*. The first chamber 22*k* and the second chamber 32*k* are arranged in sequence and communicated to each other, cooperatively forming an accommodating chamber to accommodate a male genitalia.

Differently, the driving assembly of this embodiment includes a first motor 47*k* and a second motor 48*k*, wherein the first motor 47*k* is used to drive the first stimulation member 20*k*, and the second motor 48*k* is used to drive the second stimulation member 30*k*.

Figure 1M:
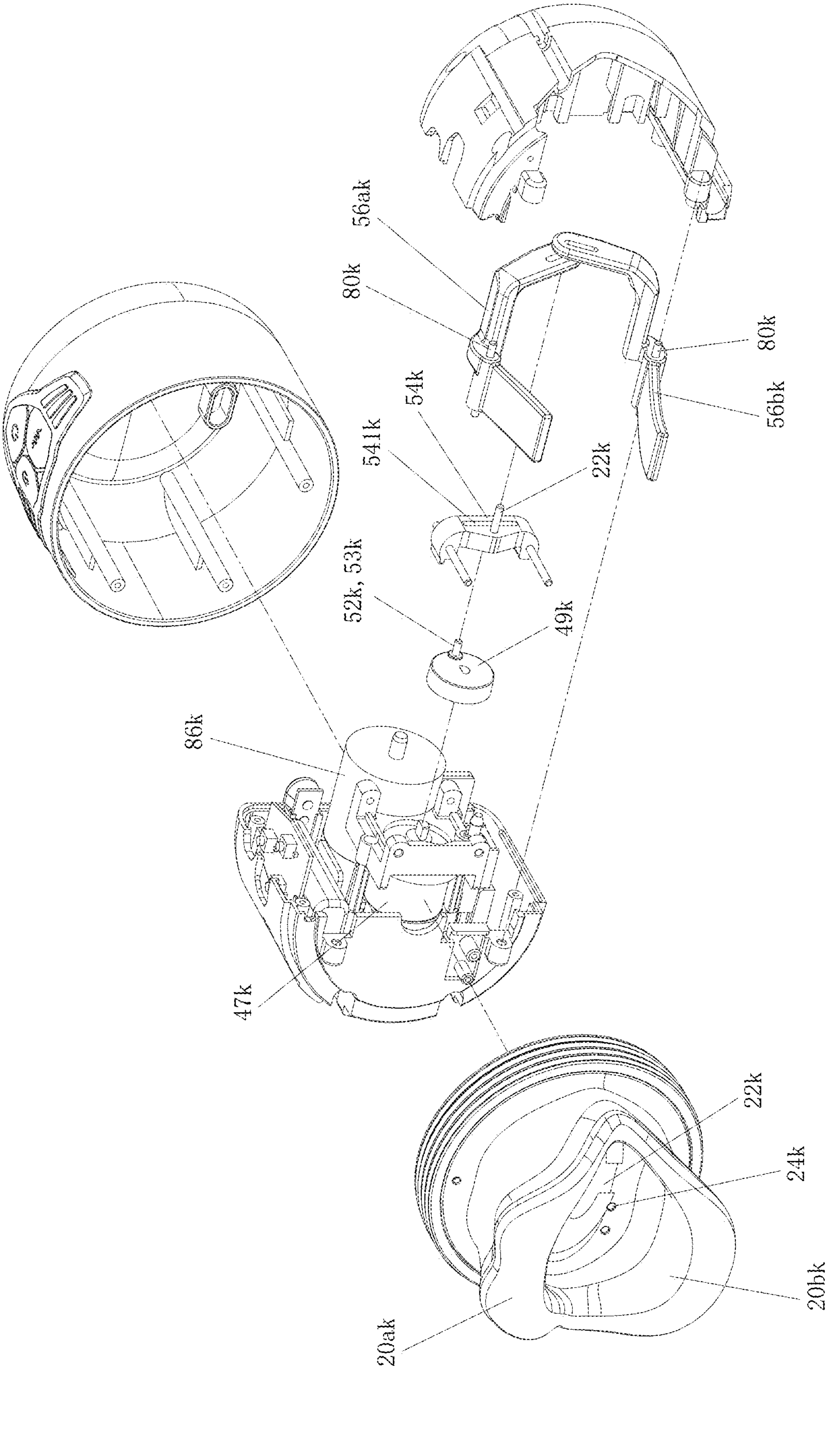
FIG. 1*m* is a further exploded view of a first stimulation member and a driving assembly of the male sexual stimulation device of FIG. 1*j*.
Figure 1N:
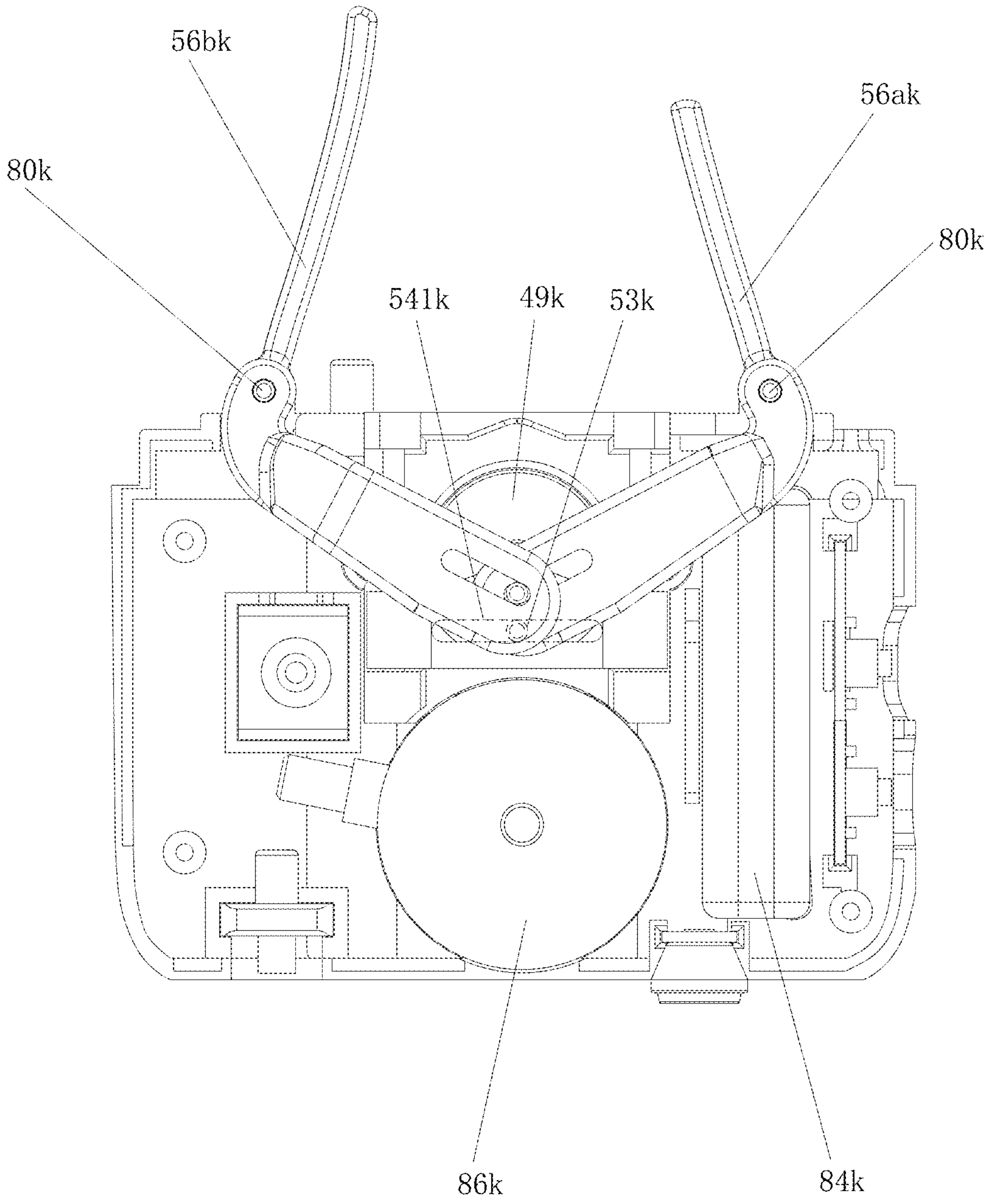
FIG. 1*n* is a side view of the driving assembly of FIG. 1*m*.
Figure 2:
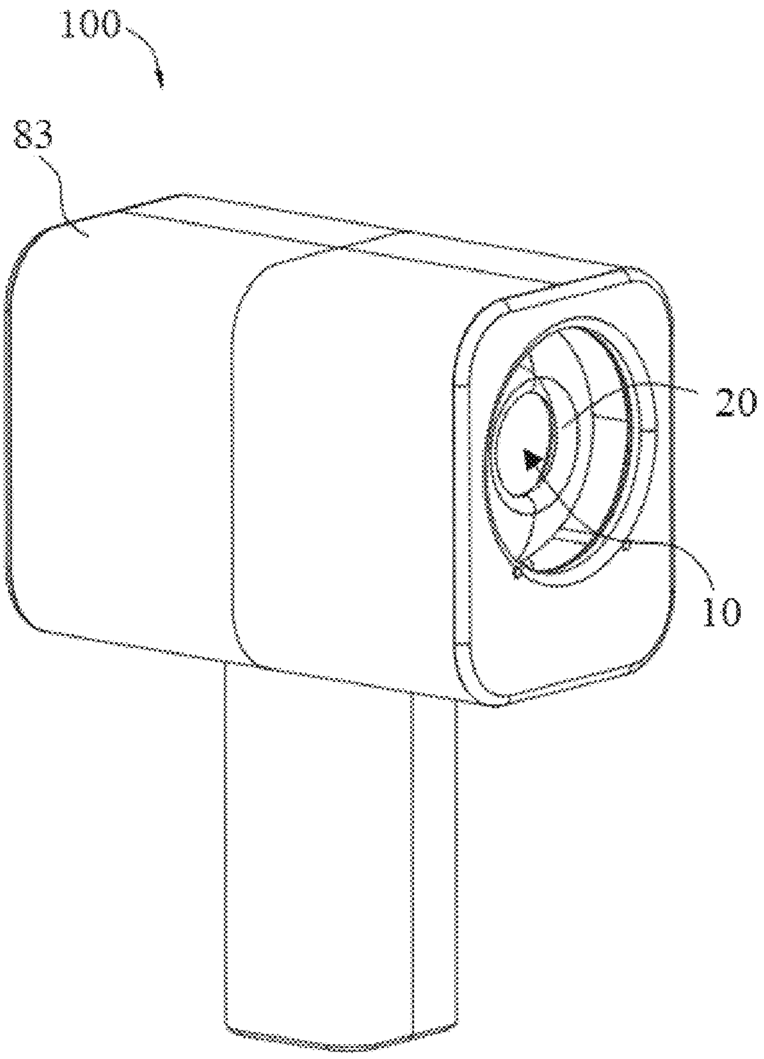
FIG. 2 is a structural schematic view of a male sexual stimulation device according to another embodiment of the present disclosure.

In this embodiment, the first motor 47*k* is a rotary motor that drives an output wheel 49*k* to rotate at an appropriate speed. The output wheel 49*k* is connected to the first and second swinging arms 56*ak*, 56*bk* through a transmission unit 50*k*. As shown in FIG. 1*m* and FIG. 1*n*, the transmission unit 50*k* includes a first transmission member 52*k* and a first sliding member 54*k*. The first transmission member 52*k* includes a first transmission shaft 53*k* eccentrically arranged relative to a rotary axis of the output wheel 49*k*, and a first sliding groove 541*k* is defined in the first sliding member 54*k*. The first transmission shaft 53*k* is movably inserted into the first sliding groove 541*k*.

The first swinging arm 56*ak* and the second swinging arm 56*bk* each are rotatably mounted in the device 100*k* through a pivot 80*k*, with one end thereof movably connected to the first sliding member 54*k* and the other end thereof extending into the first stimulation portion 20*ak* or the second stimulation portion 20*bk* of the first stimulation member 20*k*.

Under the action of the first motor 47*k*, the first transmission shaft 53*k* rotates in the XZ plane, and through its cooperation with the first sliding groove 541*k*, drives the first sliding member 54*k* to move back and forth in the X direction, which in turn drives the first swinging arm 56*ak* and the second swinging arm 56*bk* connected to it to swing relative to each other, finally causing the first stimulation portion 20*ak* and the second stimulation portion 20*bk* to clamp and knead the glans of the male genitalia accommodated in the first chamber 22*k*.

In this embodiment, the second motor 48*k* is a vibration motor embedded in the second stimulation member 30*k*, causing the second stimulation member 30*k* to vibrate at high frequency, thereby stimulating the male genitalia accommodated in the second chamber 32*k*.

In this embodiment, the first and second stimulation members 20*k*, 30*k*, under the action of the driving assembly, stimulate the male genitalia in different manners, wherein the first stimulation member 20*k* has a clamping and kneading effect on the male genitalia, and the second stimulation member 30*k* has a vibrating stimulating effect on the male genitalia. The two different effects enable the male genitalia to be fully stimulated, resulting in better user experience.

It should be understood that the second stimulation member 30*k* may be driven to move back and forth in the axial direction while vibrates under the driving of the second motor 48*k*, thereby further enhancing its stimulation effect. For example, a transmission unit may be provided to connect the second stimulation member 30*k* to the first motor 47*k*; or, an additional motor can be provided to drive the second stimulation member 30*k* to move back and forth.

It should be understood that the second stimulation member 30*k* may be driven to rotate while vibrates under the driving of the second motor 48*k*, thereby further enhancing its stimulation effect. The rotation of the second stimulation member 30*k* may be driven by the first motor 47*k* or by an additional motor. In addition, the linear movement, rotation of the second stimulation member may be performed independently, that is, without starting the vibration motor 48*k* or without setting the vibration motor 48*k*.

In this embodiment, as shown in FIG. 1*l* and FIG. 1*m*, the device 100*k* further includes an air pump 86*k*, which is connected to the first chamber 22*k* of the first stimulation member 20*k* through a pipeline, so as to suck air from the first chamber 22*k* to generate a negative pressure effect, further stimulating the male genitalia, especially the glans, in the first chamber 22*k*. As shown in FIG. 1*l*, the bottom of the first stimulation member 20*k* is provided with a hole 24*k*, which is connected to the pipeline of the air pump 86*k*, so that the air in the first chamber 22*k* can be discharged. To simplify the drawings, the pipeline between the air pump 86*k* and the hole 24*k* is not shown.

During use, the male genitalia may be stimulated only by the swinging of the first and/or second stimulation portions of the first stimulating member, and may be further stimulated by the linear movement, rotation, vibration, etc. of the second stimulating member, and/or may be further stimulated by the suction of the air pump, getting better stimulation effect and better user experience.

In conclusion, a pinching and holding function that stimulates the male penis is achieved by the above embodiment of the present disclosure. Furthermore, the present disclosure also provides the following embodiments that stimulates male penis by pinching and holding function.

According to another embodiment of the present disclosure, referring to FIGS. 2 to 5, a male sexual stimulation device 100 having an accommodating space 10 extending along a longitudinal direction of the male sexual stimulation device 100 for insertion of a male penis. The male sexual stimulation device 100 includes a first massage component 20 and a second massage component 30. The first and second massage components 20, 30 are arranged one after another in the longitudinal direction. The first massage component 20 defines a first cavity 11 constituting a first part of the accommodating space 10. The second massage component 30 defines a second cavity constituting a second part of the accommodating space 10. The first massage component 20 is drivable to slide in the longitudinal direction. The second massage component 30 is drivable to slide in the longitudinal direction too. Upon driven, the first massage component 20 and second massage component 30 slide towards or away from each other in the longitudinal direction.

The male sexual stimulation device 100 of the present disclosure is used for electrically massaging the genitalia, such as the penis, for providing an intense sexual stimulation to the penis. During use, the penis is inserted into the accommodating space 10 constituted by the first and second massage components 20, 30. With the reciprocating movements of the first massage component 20 and the second massage component 30 towards and away from each other, the first and second massage components 20, 30 cooperatively provide holding and pinching stimulation for penis, which improves the users' sexual experience.

In the above embodiment, the male sexual stimulation device 100 includes an actuator 60 and a transmission component 40 in torque-transmission connection with the actuator 60. The actuator 60 is arranged on a bottom side of the transmission component 40, and the first and second massage components 20, 30 are arranged on a top side of the transmission component 40. The first massage component 20 is in torque-transmission connection with the transmission component 40 and is drivable to slide by the actuator 60 through the transmission component 40. The second massage component 30 is in torque-transmission connection with the transmission component 40 and is drivable to slide by the actuator 60 through the transmission component 40.

Figure 4:
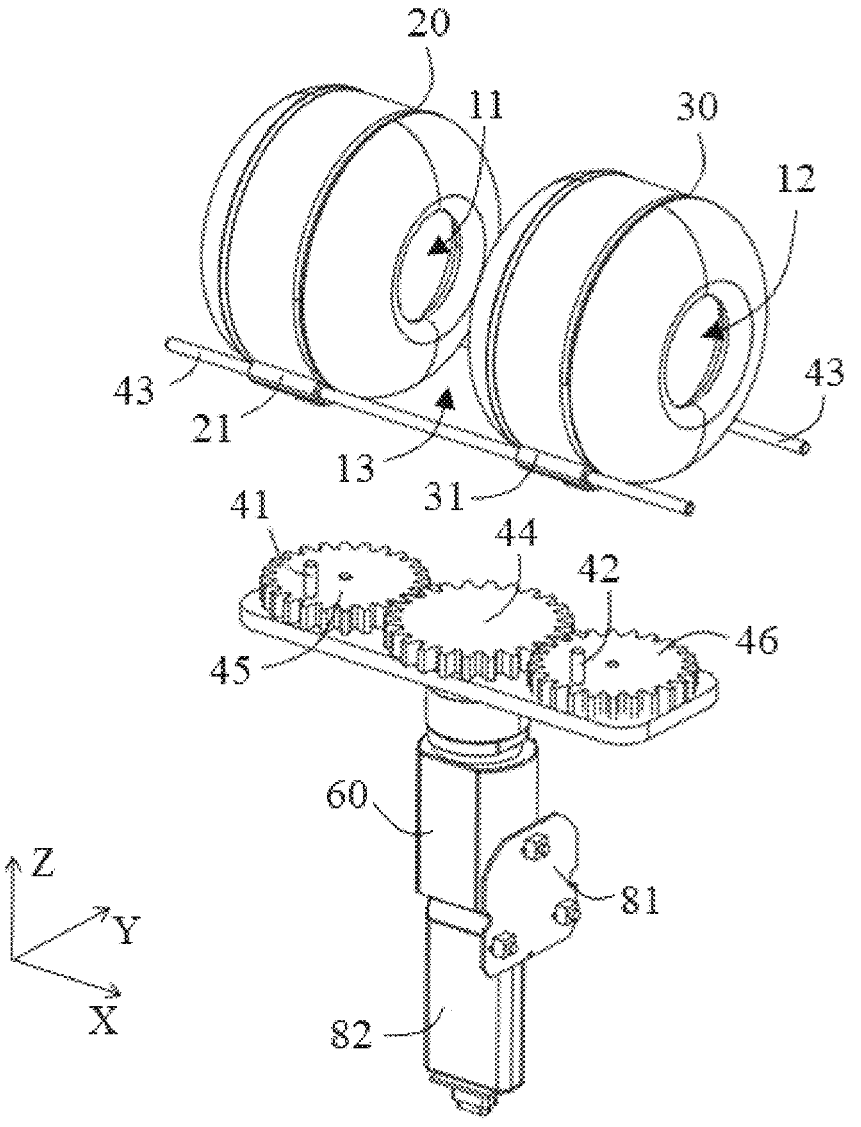
FIG. 4 is a partially exploded structural view of FIG. 3.
Figure 5:
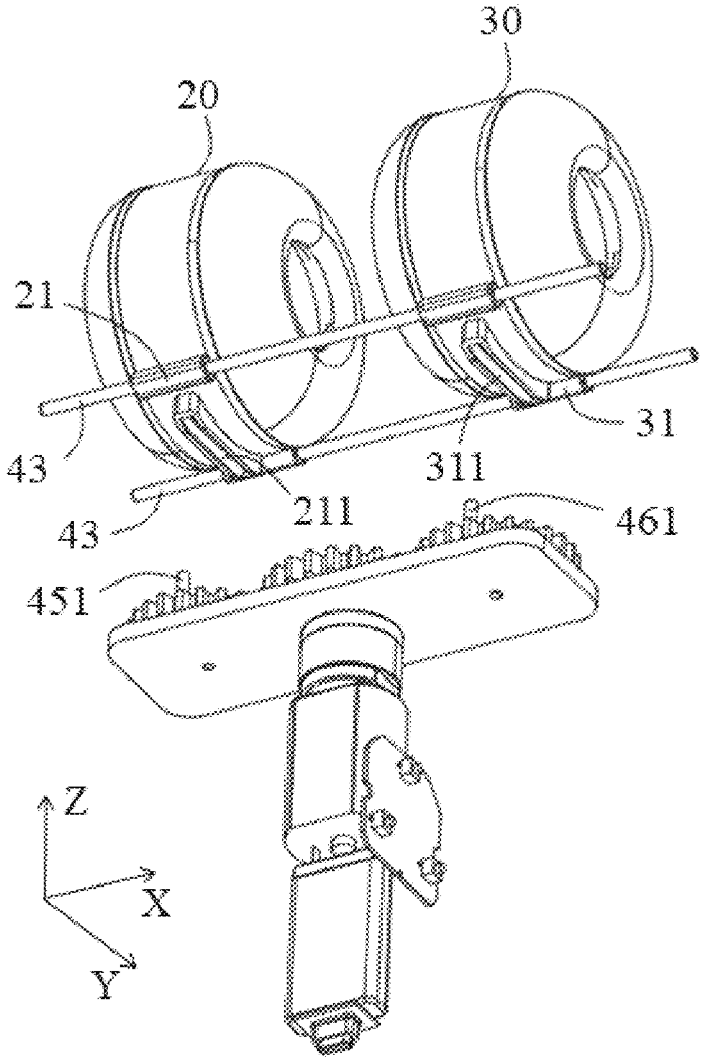
FIG. 5 is a structural schematic view of FIG. 4, from another view angle.

That is, both the first and second massage components 20, 30 are in torque-transmission connection with the transmission component 40, so that the actuator 60 can simultaneously drive the first and second massage components 20, 30 to move towards or away from each other in the longitudinal direction via the transmission component 40. In FIG. 4, the longitudinal direction is indicated with the X-direction, and the Z-direction indicates a vertical direction extending in the top and bottom that is perpendicular to the longitudinal direction.

Specifically, the transmission component 40 includes a first actuating element 41 connected to the first massage component 20 and a second actuating element 42 connected to the second massage component 30. The first and second actuating elements 41, 42, driven by the actuator 60 drive the first and second massage components 20, 30 to slide towards or away from each other along the longitudinal direction.

Specifically, in one embodiment, referring to FIGS. 2 to 5, the first massage component 20 includes a first guide slider 21 having a first engagement groove 211, and the second massage component 30 includes a second guide slider 31 having a second engagement groove 311. The transmission component 40 includes at least one guide rail 43, preferably two guide rails 43. The two guide rails 43 are fixed relative to the housing 83, arranged in parallel and extend in the longitudinal direction. The first and second guide sliders 21, 31 are respectively slidably mounted on the two guide rails 43.

The first engagement groove 211 and the second engagement groove 311 are elongated. Extension directions of the first engagement groove 211 and second engagement groove 311 intersect respectively reciprocal sliding directions of the first massage component 20 and the second massage component 30. Preferably, the first engagement groove 211 extends along a lateral direction that is perpendicular to the reciprocal sliding direction of the first massage component 20, and the second engagement groove 311 extends along a lateral direction that is perpendicular to the reciprocal sliding direction of the second massage component 30. The lateral direction is indicated with the Y-direction shown in FIG. 4. The first actuating element 41 and the second actuating element 42 are slidably engaged in the first engagement groove 211 and the second engagement groove 311, respectively.

The first and second guide sliders 21, 31 are respectively slidably mounted to the two guide rails 43, providing guidance and limiting effect on the first and second massage components 20, 30. When the first and second actuating elements 41, 42 rotate, which cause movements of the first and second massage components 20, 30 through the engagements with the first and second engagement grooves 211, 311 respectively, due to the restriction of the fixed guide rails 43, the first and second massage components 20, 30 can only perform linear movements along the guide rails 43, which ensures that the first and second massage components 20, 30 can move stably and have a structural reliability during pinching massage for the penis. In particular, the design of the two parallel spaced apart guide rails 43 can form a dual-side restriction and guidance for the first and second massage components 20, 30, which can further improve the stability of the reciprocating movements of the first and second massage components 20, 30.

Figure 3:
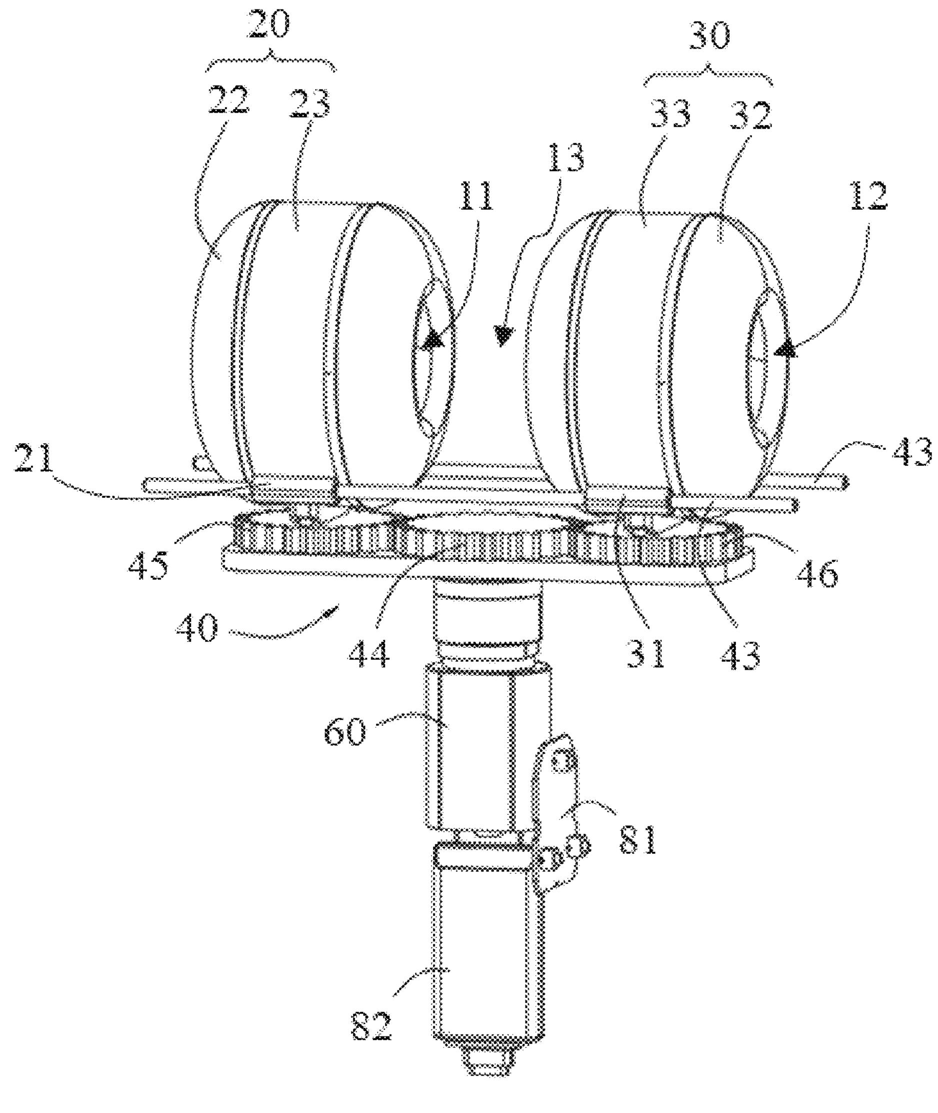
FIG. 3 is a structural schematic view illustrating the interior structure of the male sexual stimulation device depicted in FIG. 1.

In the above embodiment, particularly refer to FIG. 3, the first massage component 20 includes a first flexible body 22 defining the first cavity 11 and a first support 23, and the second massage component 30 includes a second flexible body 32 defining the second cavity 12 and a second support 33.

The first support 23 is used to fix the first flexible body 22 to the first guide slider 21. The second support 33 is used to fix the second flexible body 32 to the second guide slider 31.

The first and second supports 23, 33 are typically made of materials with a certain hardness and anti-deformation ability, such as rigid plastics, metals, etc., so that the first and second supports 23, 33 can serve as the skeletons of the first and second flexible bodies 22, 32 to provide enough structural strength for supporting and positioning. For example, the first and second flexible bodies 22, 32 are annular, and correspondingly the first and second supports 23, 33 are also annular structures.

The first and second guide sliders 21, 31 are slidably mounted to the at least one guide rail 43, preferably two guide rails 43, so as to drive the first and second massage components 20, 30 to reciprocate along the at least one guide rail 43 with a certain travel distance, driven by the transmission component 40, thereby achieving the reciprocating movements of the first and second massage components 20, 30 towards and away from each other.

The first and second flexible bodies 22, 32 may be made of a soft material, including but not limited to stretchable soft silicone, which is non-toxic, antibacterial and chemically stable. Therefore, such skin-friendly soft material can improve the users' experience.

In the above embodiment, at least one of the first flexible body 22 and the second flexible body 32 may be a circumferentially closed annular structure. The first and second supports 23, 33 are attached to the exteriors of the first and second flexible bodies 22, 32, respectively. In other embodiments, at least one of the first flexible body 22 and the second flexible body 32 may be an annular structure with a notch, i.e., disconnected in the circumferential direction.

In the above embodiment, as shown in FIG. 3, a gap between the first massage component 20 and the second massage component 30 in the longitudinal direction defines a third cavity 13, that constitutes a third part of the accommodating space 10. That is, the penis may insert into the third cavity 13 along the longitudinal direction of the first and second flexible bodies 22, 32, and an end of the first flexible body 22 towards the second flexible body 32 and an end of the second flexible body 32 towards the first flexible body 22 squeeze the penis to achieve the massage effect.

Alternatively, the first cavity 11 defined by the first massage component 20, the second cavity 12 defined by the second massage component 30, and the third cavity 13 defined by the gap between the first massage component 20 and the second massage component 30 cooperatively form the accommodating space 10 for massaging the penis. During use, the penis is sequentially inserted into the first cavity 11, the third cavity 13, and the second cavity 12 along the longitudinal direction. The first and second massage components 20, 30 form a sliding kneading massage on the penis in the course of the reciprocating motions of the first and second massage components 20, 30 towards and away from each other.

Alternatively, the male sexual stimulation device 100 may include a connecting body provided between the first and second flexible bodies 22, 32 along the longitudinal direction. The first flexible body 22, the second flexible body 32 and the connecting body are integrally molded as a one-piece structure. The gap between the first and second flexible bodies 22, 32 and the connecting body forms the third cavity 13. The first cavity 11, the second cavity 12, and the third cavity 13 cooperatively form the accommodating space 10. Since the first flexible body 22, the second flexible body 32 and the connecting body are integrally molded as a one-piece structure, but the first guide slider 21 and the second guide slider 22 are two parts individual to each other, when the first and second guide sliders 21, 22 move towards or away from each other, the first and second flexible bodies 22, 32 will be deformed under the constraints of the connecting body, so that it is possible to form a pinch massage for the penis inserted into the accommodating space 10.

In the above embodiment, the male sexual stimulation device 100 further includes a housing 83. The actuator 60, the transmission component 40, and the first and second massage components 20, 30 are assembled to the housing 83. The housing 83 together with the actuator 60, the transmission component 40, and the first and second massage components 20, 30 form a modular structure, and the male sexual stimulation device 100 therefore has a compact structure and a lightweight volume, which is convenient to use and saves effort, enhancing the sense of using experience.

The male sexual stimulation device 100 further includes a circuit board 81 and a battery 82. The actuator 60 is a motor. The battery 82 is electrically connected to the circuit board 81. The circuit board 81 is electrically connected to the motor. The motor is in torque-transmission connection with the transmission component 40. The circuit board 81 is used to receive input commands or instructions from the users, such as switching on, switching off, adjusting the speed, mode, etc., the circuit board 81 then outputs working commands to the motor, so that the motor in turn can output corresponding torque to the transmission component 40 at a preset speed, and thereby controlling the first and second massage components 20, 30 to perform a reciprocating massage on the penis at the desired speed and squeezing force.

The battery 82 is used to power the entire device. Preferably, the battery 82 is a rechargeable battery 82 to enhance the durability and convenience in use of the male sexual stimulation device 100.

In one embodiment, the transmission component 40 may include specifically a drive gear 44, a first driven gear 45, and a second driven gear 46, a first eccentric rod 451, and a second eccentric rod 461. The drive gear 44 is in torque-transmission connection with the actuator 60. The first and second driven gears 45, 46 are both engaged with the drive gear 44 and arranged on radially opposite sides of the drive gear 44. The first eccentric rod 451 is fixed on the first driven gear 45 and slidably arranged within the first engagement groove 211 of the first guide slider 21. The second eccentric rod 461 is fixed on the second driven gear 46 and slidably arranged within the second engagement groove 311 of the second guide slider 31. That is, the first eccentric rod 451 fixed on the first driven gear 45 serves as the first actuating element 41, the second eccentric rod 461 fixed on the second driven gear 46 serves as the second actuating element 42.

During use, the actuator 60, i.e., the motor, drives the drive gear 44 to rotate, and the drive gear 44 in turn drives the first driven gear 45 and the second driven gear 46 to rotate in opposite directions simultaneously. The rotation of first driven gear 45 causes the first eccentric rod 451 to slide in the first engagement groove 211, and the first eccentric rod 451 in turn drives the first guide slider 21 to move by applying a push or pull force to the side wall of the first engagement groove 211, which in turn causes the first massage component 20 to move longitudinally along a first direction.

Similarly, the rotation of the second driven gear 46 causes the second eccentric rod 461 to slide in the second engagement groove 311, and the second eccentric rod 461 in turn drives the second guide slider 31 to move by applying a push or pull force to the side wall of the second engagement groove 311, which in turn causes the second massage component 30 to move longitudinally along a second direction opposite to the first direction. The first massage component 20 and the second massage component 30 move longitudinally in opposite directions, thereby enabling the two massage components 20, 30 to move linearly towards or away from each other, and achieving a massage effect on the penis.

Figure 6:
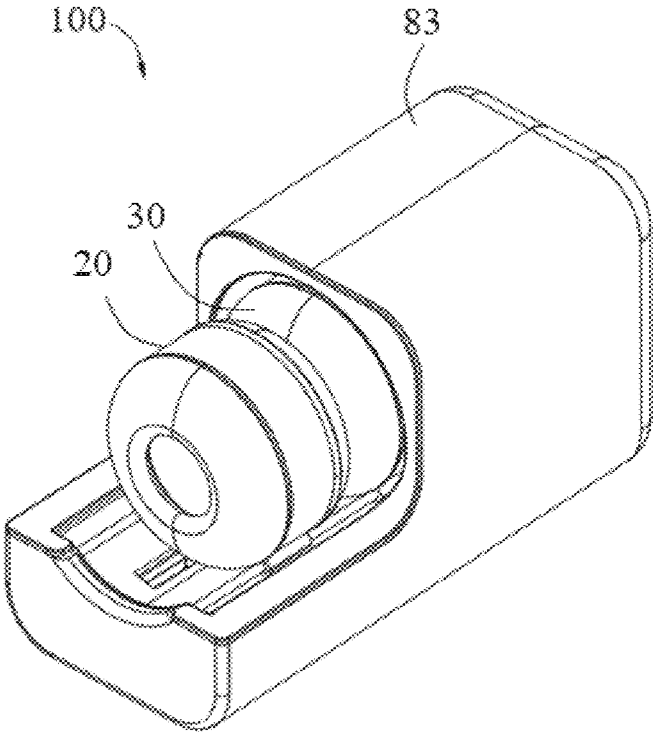
FIG. 6 is a structural schematic view of a male sexual stimulation device according to yet another embodiment of the present disclosure.
Figure 7:
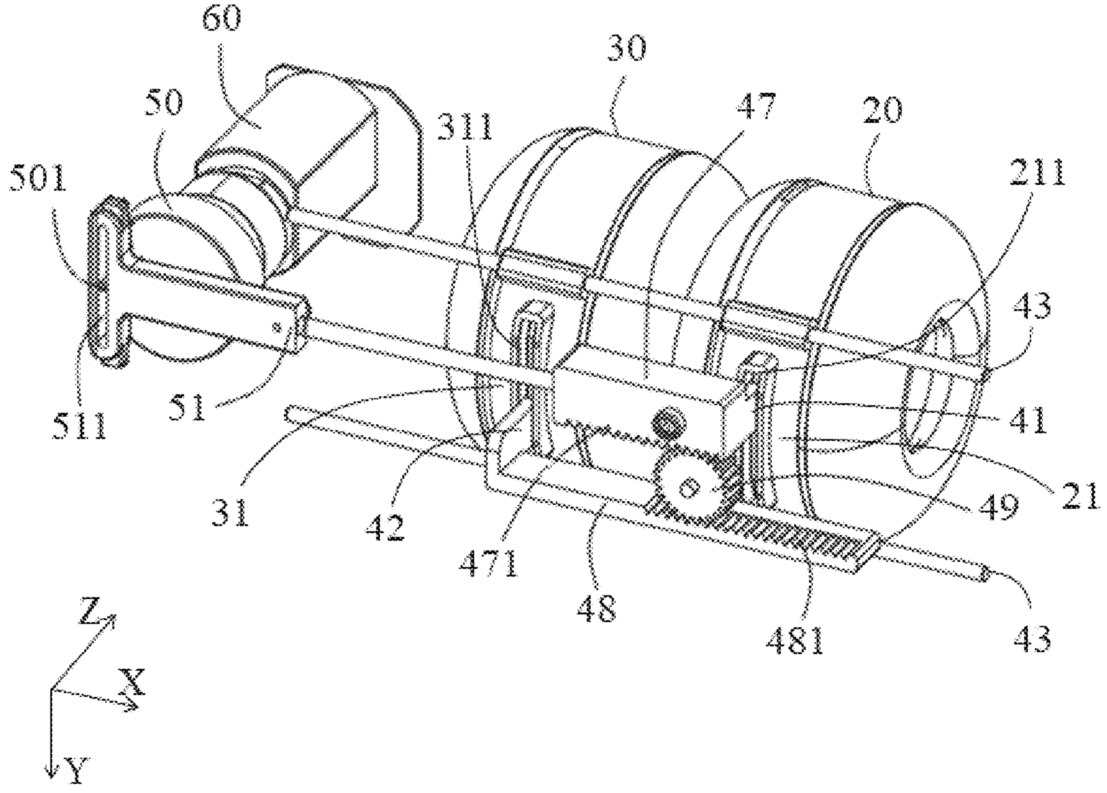
FIG. 7 is a structural schematic view illustrating the interior structure of the male sexual stimulation device depicted in FIG. 6.

FIGS. 6 and 7 show an alternative transmission component 40. In this embodiment, the actuator 60 is arranged on one longitudinal end of the first and second massage components 20, 30, and the transmission component 40 is arranged on a bottom side of the first and second massage components 20, 30. The actuator 60 is a motor. The battery 82 is electrically connected to the circuit board 81. The circuit board 81 is electrically connected to the motor.

The transmission component 40 includes a rotating wheel 50 having a third eccentric rod 501 and a push-pull rod 51 having an elongated hole 511. A drive shaft of the motor is in torque-transmission connection with the rotating wheel 50. The third eccentric rod 501 is slidably engaged into the elongated hole 511.

The transmission component 40 further includes a first moving block 47 having a first rack 471 extending along the longitudinal direction, a second moving block 48 having a second rack 481 extending along the longitudinal direction, and a transmission gear 49 meshed with both the first rack 471 and the second rack 481. The first and second racks 471, 481 are both engaged with the transmission gear 49 and disposed on opposite sides of the transmission gear 49. Two guide rails 43 are arranged in parallel and both extend in the longitudinal direction. The first and second massage portions 20, 30 are slidably mounted to the guide rails 43.

The first moving block 47 is connected to one longitudinal end of the push-pull rod 51, a portion of the first moving block 47 as the first actuating element 41 is engaged into the first engagement groove 211 of the first guide slider 21. A portion of the second moving block 48 as the second actuating element 42 is engaged into the second engagement groove 311. Two sides of each of the first guide slider 21 and the second guide slider 31 are slidably mounted to two guide rails 43 respectively.

In summary, the difference between the embodiment depicted in FIGS. 6-7 and the embodiment shown in FIGS. 2-5 are as follows. The embodiment depicted in FIGS. 6-7 adopts the push-pull movement of the push-pull rod 51, coupled with the meshing transmission among the first rack 471, the transmission gear 49 and the second rack 481. When the motor is actuated, the rotating wheel 50 together with the third eccentric rod 501 rotates, which causes the push-pull rod 51 to move linearly in a first direction, and drives the transmission gear 49 to rotate through the first rack 471, and the rotation of the transmission gear 49 drives the second rack 481 to move linearly in a second direction opposite to the first direction. The first rack 471 and the second rack 481 move linearly in opposite directions mean the first moving block 47 and the second moving block 48 move linearly in opposite directions, and the first moving block 47 and the second moving block 48 in turn drive the first guide slider 21 of the first massage component 20 and the second guide slider 31 of the second massage component 30 to move towards or away from each other, thereby achieving the massage effect on the penis inserted into the accommodating space 10.

In this embodiment, the portion of the first moving block 47 is engaged into the first engagement groove 211 of the first guide slider 21 to achieve the connection of the first moving block 47 and the first guide slider 21. The portion of the second moving block 48 is engaged into the second engagement groove 311 of the second guide slider 31 to achieve the connection of the second moving block 48 and the second guide slider 31. However, it should be noted that, the connection between the first moving block 47 and the first guide slider 21, and the connection between the second moving block 48 and the second guide slider 31 can be achieved by other means, for example, snapping-fitting, interference fit, or form-fitting connection. That is, in this embodiment, there is no need for the first moving block 47 to slide relative to the first guide slider 21, and there is no need for the second moving block 48 to slide relative to the second guide slider 31, the first and second moving blocks 47, 48 can thus be detachably or fixedly connected to the corresponding guide sliders 21, 31 by any known connection means. Alternatively, the first moving block 47 and the first guide slider 21 may be integrally formed as one single piece, and the second moving block 48 and the second guide slider 31 may be integrally formed as one single piece.

Figure 8:
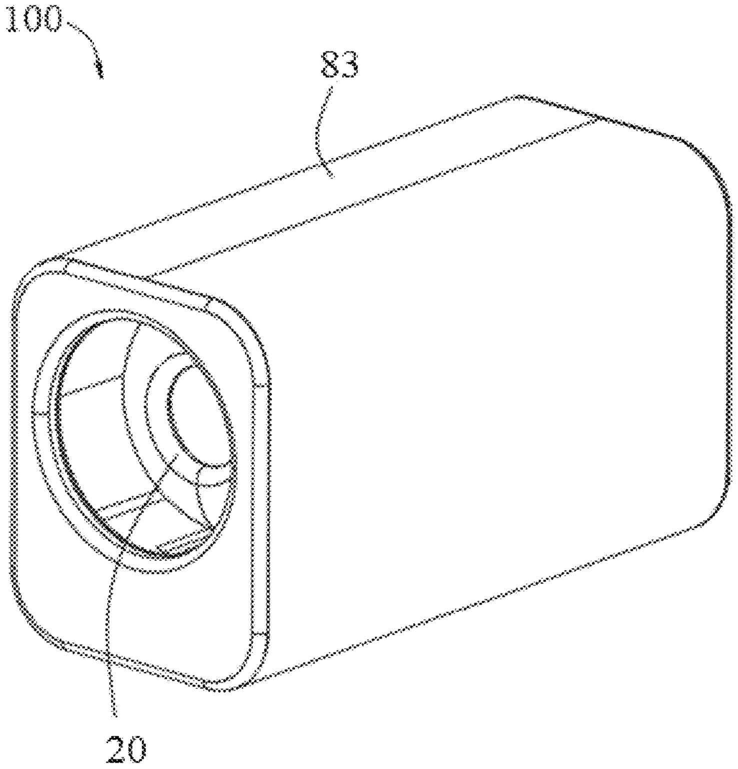
FIG. 8 is a structural schematic view of a male sexual stimulation device according to a further embodiment of the present disclosure.
Figure 9:
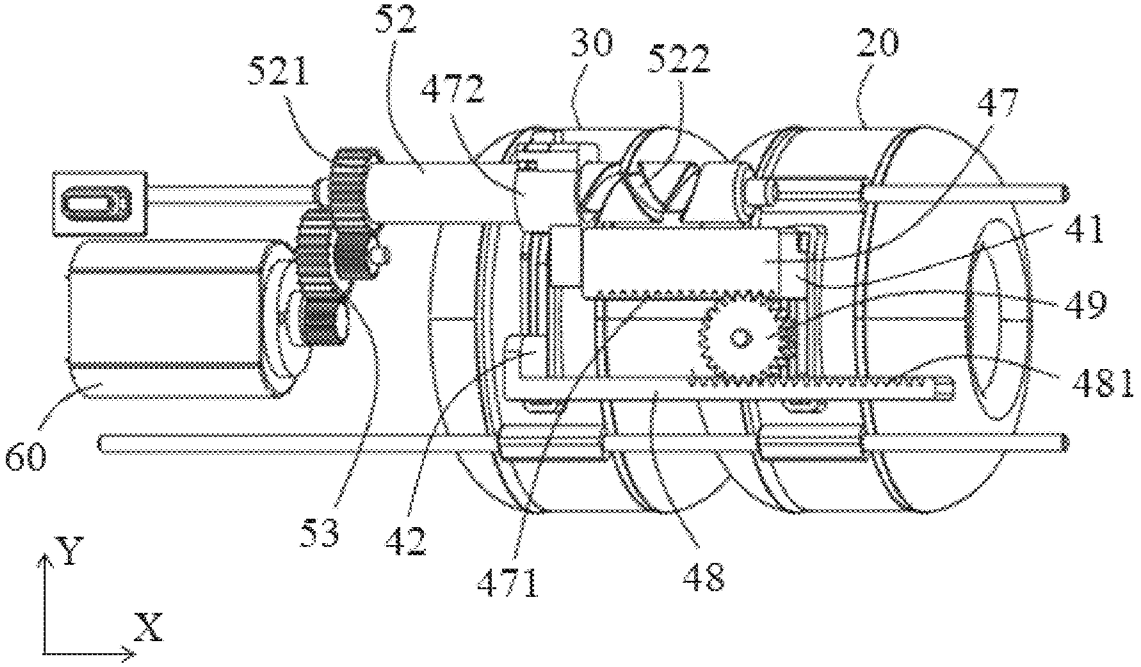
FIG. 9 is a structural schematic view illustrating the interior structure of the male sexual stimulation device depicted in FIG. 8.

FIGS. 8 and 9, show a yet alternative transmission component 40. In this embodiment, the transmission component 40 is arranged on a bottom side of the first and second massage components 20, 30, and the actuator 60 is arranged on one longitudinal end of the transmission component 40. The actuator 60 is a motor. The battery 82 is electrically connected to the circuit board 81. The circuit board 81 is electrically connected to the motor.

The transmission component 40 includes a first transmission rod 52 extending along the longitudinal direction and a first gear set 53. A drive shaft of the motor is in torque-transmission connection with the first gear set 53. The first transmission rod 52 is provided with a first gear portion 521 and a first threaded portion 522 at two longitudinal ends, respectively. The first gear portion 521 is engaged with the first gear set 53.

The transmission component 40 further includes a first moving block 47, a second moving block 48, a transmission gear 49, and two guide rails 43. The guide rails 43 extend along the longitudinal direction and are arranged in parallel. The first moving block 47 includes a first threaded sleeve 472 and a first rack 471 connected to each other. The first rack 471 extends along the longitudinal direction. The first threaded sleeve 472 is threadedly engaged with an exterior of the first threaded portion 522. The first moving block 47 can move linearly but cannot rotate. Thus, due to the engagement between the first threaded portion 522 and the first threaded sleeve 472, the first moving block 47 moves linearly as the first transmission rod 52 rotates.

A portion of the first moving block 47 as the first actuating element 41 is engaged into the first engagement groove 211 of the first guide slider 21. The second moving block 48 is provided with a second rack 481 extending along the longitudinal direction. The first and second racks 471, 481 are both engaged with the transmission gear 49 and disposed on opposite sides of the transmission gear 49 along the lateral direction. A portion of the second moving block 48 as the second actuating element 42 is engaged into the second engagement groove 311. Two ends of each of the first guide slider 21 and the second guide slider 31 are slidably mounted on the two guide rails 43 respectively.

In summary, the differences between the embodiment shown in FIGS. 8-9 and the aforementioned embodiment of FIGS. 2-5 and embodiment of FIGS. 6-7 are as follows. The torque output from the motor is firstly transmitted to the first gear set 53, which reduces the speed and increases the torque by the first gear set 53 and then transmitted to the first transmission rod 52, which can drive the first transmission rod 52 to rotate though the first gear portion 521. During the rotation of the first transmission rod 52, due to the threaded engagement between the first threaded portion 522 and the first threaded sleeve 472, the first transmission rod 52 drives the first threaded sleeve 472, i.e., the first moving block 47 to push or pull the first guide slider 21 to move along the two guide rails 43, depending on the rotation direction of the motor. At the same time, due to the engagements among the first rack 471, the transmission gear 49 and the second rack 481, the linear movement of the first rack 471 corresponds to the linear movement of the second rack 481 in a direction opposite to that of the first rack 471, as a result, the first moving block 47 and the second moving block 48 move simultaneously in opposite directions, which in turn cause the first guide slider 21 of the first massage component 20 and the second guide slider 31 of the second massage component 30 to move towards or away from each other, thereby achieving the massage effect on the penis inserted into the accommodating space 10.

Similar to the embodiment shown in FIGS. 6-7, the first moving block 47 and the first guide slider 21 may be connected by other means or integrally formed as one single piece. The second moving block 48 and the second guide slider 21 may be connected by other means or integrally formed as one single piece. Details please refer to the above descriptions and will not be repeated again.

Figure 10:
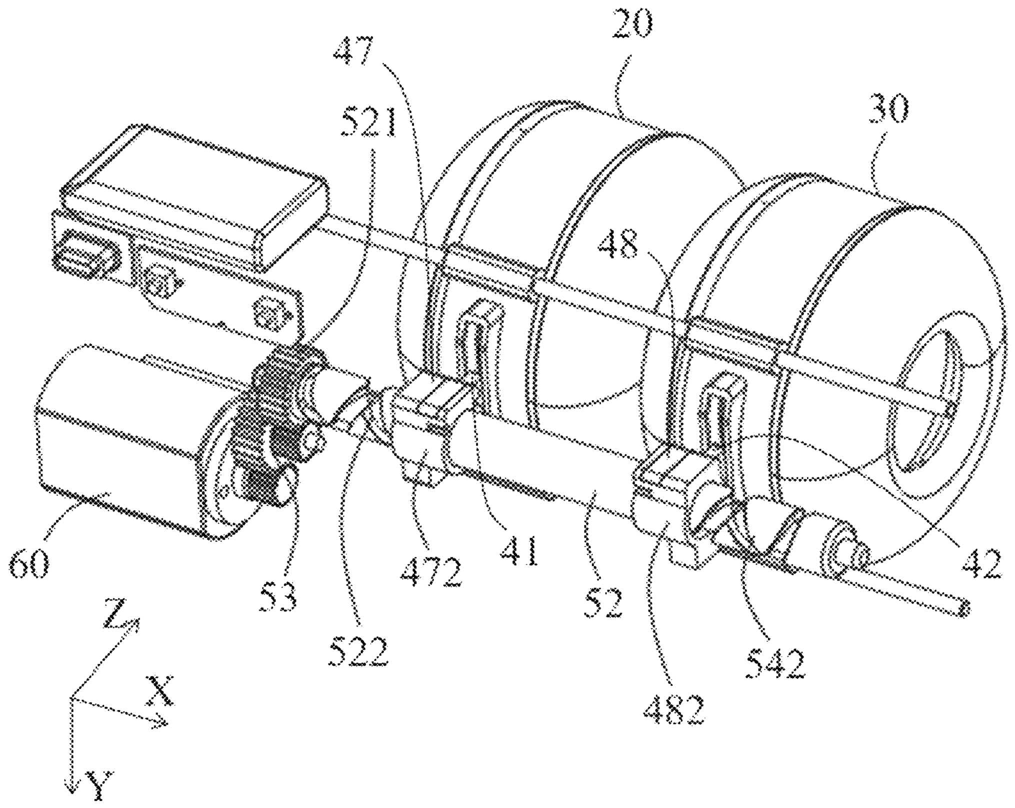
FIG. 10 is a structural schematic view illustrating an alternative interior structure of FIG. 8.
Figure 11:
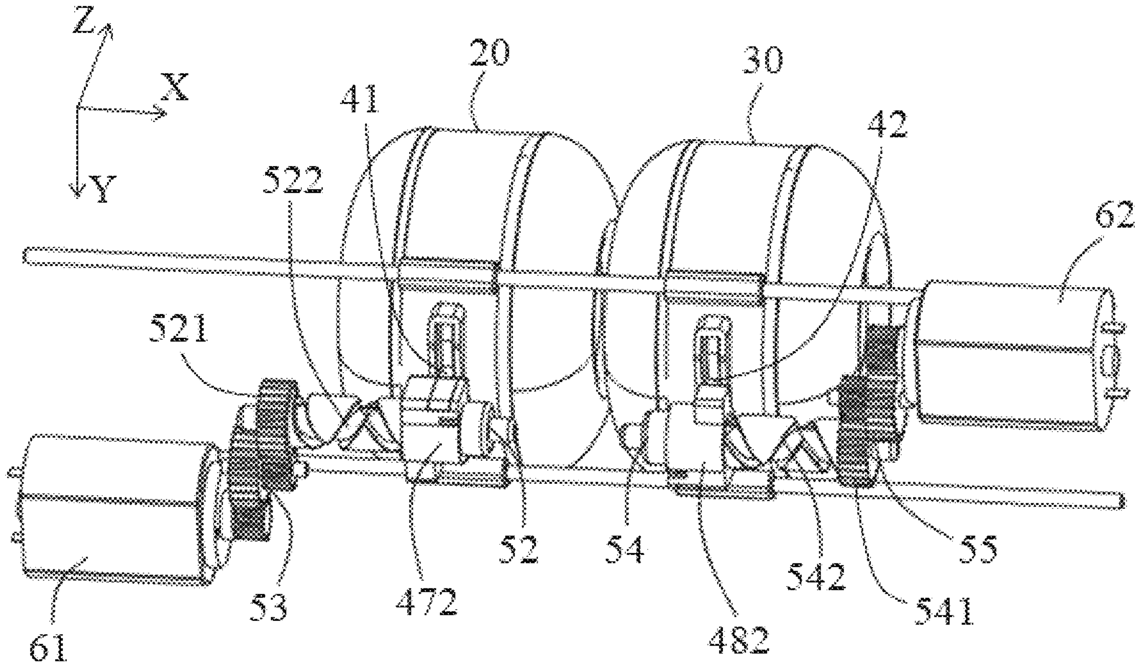
Figure 12:
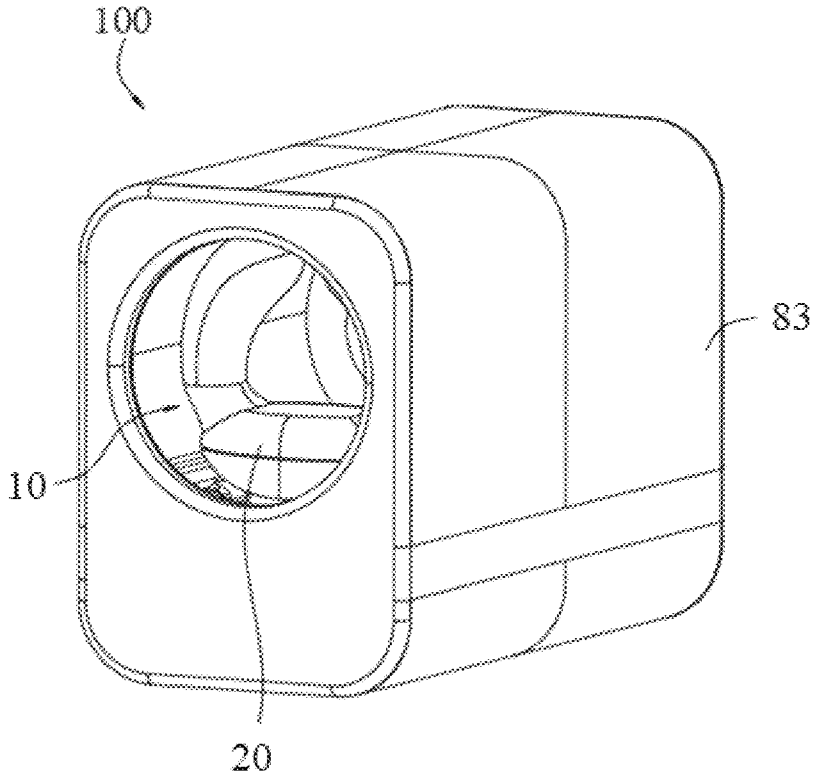
FIG. 12 is structural schematic view of a male sexual stimulation device according to an additional embodiment of the present disclosure.
Figure 13:
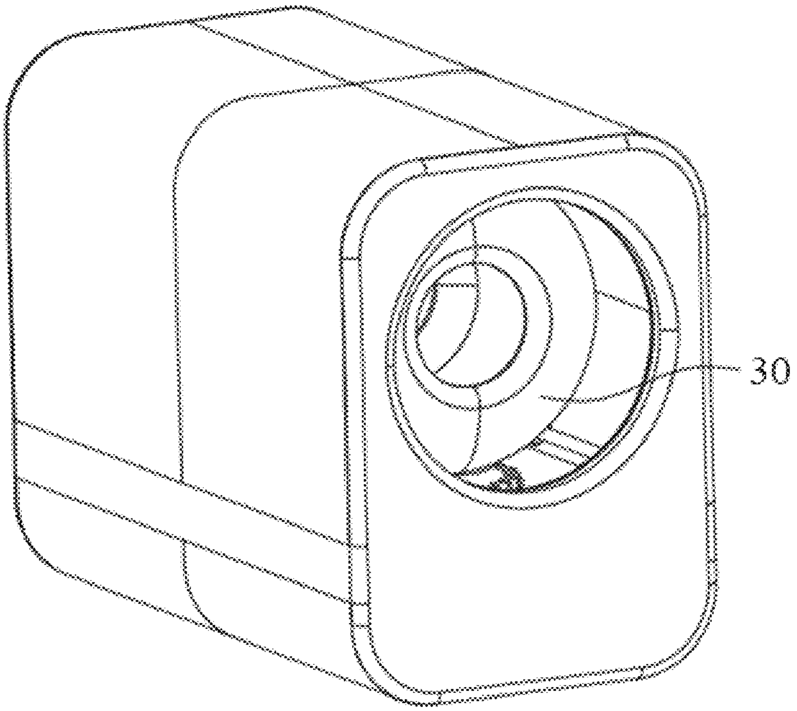
FIG. 13 is a structural schematic view of FIG. 12, from another view angle.

FIG. 10 shows a yet alternative transmission component 40. In this embodiment, the transmission component 40 is arranged on a bottom side of the first and second massage components 20, 30, and the actuator 60 is arranged on one longitudinal end of the transmission component 40. The actuator 60 is a motor. The battery 82 is electrically connected to the circuit board 81. The circuit board 81 is electrically connected to the motor.

The transmission component 40 includes a first transmission rod 52 extending along the longitudinal direction and a first gear set 53. A drive shaft of the motor is in torque-transmission connection with the first gear set 53. The first transmission rod 52 is provided with a first gear portion 521, a first threaded portion 522 and a second threaded portion 542. The first gear portion 521, the first threaded portion 522 and the second threaded portion 542 are spaced apart along an axial direction of the first transmission rod 52. The first gear portion 521 is engaged with the first gear set 53.

The transmission component 40 further includes a first moving block 47, a second moving block 48, and two guide rails 43 extending along the longitudinal direction and arranged in parallel along the lateral direction. The first moving block 47 includes a first threaded sleeve 472 threadedly engaged with an exterior of the first threaded portion 522. The first moving block 47 also includes a portion serving as the first actuating element 41 that is engaged into the first engagement groove 211 of the first guide slider 21. The second moving block 48 includes a second threaded sleeve 482 threadedly engaged with an exterior of the second threaded portion 542. The second moving block 48 further includes a portion serving as the second actuating element 42 that is engaged into the second engagement groove 311 of the second guide slider 31. Two ends of each of the first guide slider 21 and the second guide slider 31 are slidably mounted on the two guide rails 43 respectively. The first moving block 47 and the second moving block 48 can move linearly but cannot rotate.

In summary, the differences between the embodiment of FIG. 10 and the embodiment shown in FIGS. 8-9 are as follows. The first transmission rod 52 is provided with both the first and second threaded portions 522, 542, that are respectively threadedly engaged with the first threaded sleeve 472 and the second threaded sleeve 482. When the first transmission rod 52 is rotated clockwise or counter-clockwise, it drives both the first threaded sleeve 472 and the second threaded sleeve 482 to slide, and the sliding direction of the first threaded sleeve 472 at the first threaded portion 522 is opposite to the sliding direction of the second threaded sleeve 482 at the second threaded portion 542.

In this way, the first transmission rod 52 can simultaneously drive the first threaded sleeve 472 and the second threaded sleeve 482 due to their engagements with the first threaded portion 522 and the second threaded portion 542, respectively, so that the first moving block 47 and the second moving block 48 in turn cause the first guide slider 21 of the first massage component 20 and the second guide slider 31 of the second massage component 30 to move towards or away from each other, thereby achieving the massage effect on the penis inserted into the accommodating space 10. The embodiment of FIG. 10 adopts fewer parts and components and therefore has higher structural reliability.

Similar to the embodiment shown in FIGS. 6-7, the first moving block 47 and the first guide slider 21 may be connected by other means or integrally formed as one single piece. The second moving block 48 and the second guide slider 31 may be connected by other means or integrally formed as one single piece. Details please refer to the above descriptions and will not be repeated again.

Figure 11:
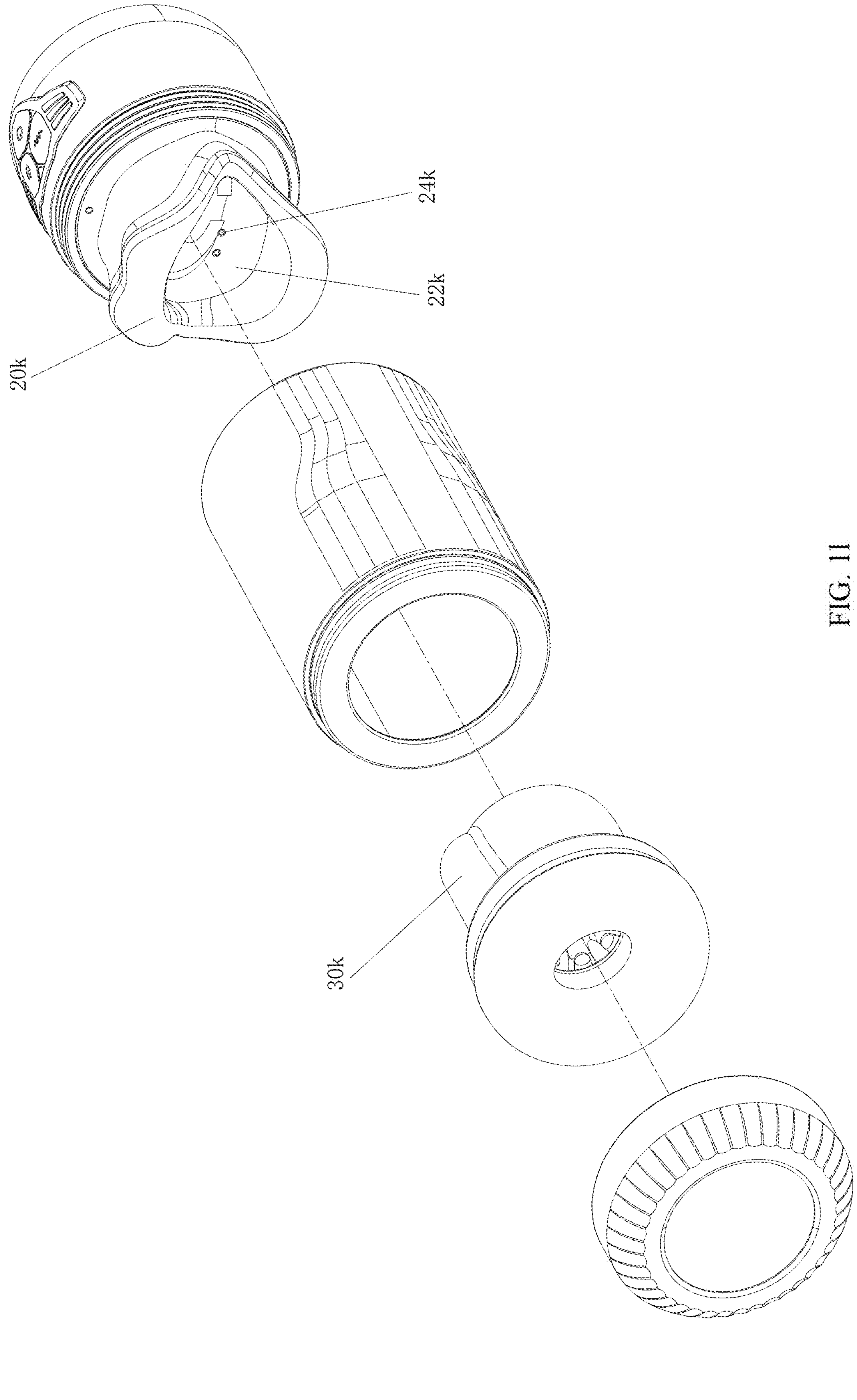
FIG. 11 is a structural schematic view illustrating yet an alternative interior structure of FIG. 8.

In the above embodiments, the first and second massage components are driven by a same motor with a same transmission assembly, and move simultaneously. It should be understood that, in other embodiments, the two massage components 20, 30 may be driven by two different actuators with respective individual transmission components. For example, FIG. 11 shows a yet alternative transmission component 40. In this embodiment, the transmission component 40 is arranged on a bottom side of the first and second massage components 20, 30, which is different from the above embodiments. In this embodiment, two motors 61, 62 are provided. Specifically, the actuator 60 includes a first motor 61 and a second motor 62. The first motor 61 and the second motor 62 are arranged on two longitudinal ends of the transmission component 40, respectively. The battery 82 is electrically connected to the circuit board 81. The circuit board 81 is electrically connected to the motors.

The transmission component 40 includes a first gear set 53 and a second gear set 55 respectively in torque-transmission connection with first motor 61 and the second motor 62. The transmission component 40 further includes a first transmission rod 52, a second transmission rod 54, a first moving block 47, a second moving block 48 and two guide rails 43 extending along the longitudinal direction and arranged in parallel along the lateral direction.

The first transmission rod 52 is provided with a first gear portion 521 and a first threaded portion 522. The first gear portion 521 is engaged with the first gear set 53, so that the first transmission rod 52 is driven by the first motor 61 to rotate through the first gear set 53.

The first moving block 47 includes a first threaded sleeve 472 threadedly engaged with an exterior of the first threaded portion 522. A portion of the first moving block 47 as the first actuating element 41 is engaged into the first engagement groove 211 of the first guide slider 21. The first moving block 47 can move linearly but cannot rotate. Due to the engagement between the first thread sleeve 472 and the first threaded portion 522, the first moving block 47 moves linearly as the first transmission rod 52 rotates.

The second transmission rod 54 is provided with a second gear portion 541 and a second threaded portion 542. The second gear portion 541 is engaged with the second gear set 55, so that the second transmission rod 54 is driven by the second motor 62 to rotate through the second gear set 55. That is, the first transmission rod 52 and the second transmission rod 54 are driven by the first motor 61 and the second motor 62, respectively and independently.

The second moving block 48 includes a second threaded sleeve 482 threadedly engaged with an exterior of the second threaded portion 542. A portion of the second moving block 48 as the second actuating element 42 is engaged into the second engagement groove 311 of the second guide slider 31. The second moving block 48 can move linearly but cannot rotate. Due to the engagement between the second thread sleeve 482 and the first threaded portion 542, the second moving block 48 moves linearly as the second transmission rod 54 rotates.

Two ends of each of the first guide slider 21 and the second guide slider 31 are slidably engaged with the two guide rails 43 respectively.

The working principle of the embodiment shown in FIG. 11 is basically the same as that of the embodiment of FIG. 10 described above, with the only difference in that the first and second massage components 20, 30 are driven to move towards or away from each other independently by means of the respective motors, gear sets, and threaded transmission pairs. The first massage component 20 is driven individually via the first motor 61, the first gear set 53, the first transmission rod 52, and the first moving block 47, and the second massage component 30 is driven individually via the second motor 62, the second gear set 55, the second transmission rod 54, and the second moving block 48. This structural design at least ensures that when one of the motors fails, the other motor is still able to drive the corresponding massage component to achieve the reciprocating movement, which in turn ensures that the first and second massage components 20, 30 continue to perform the movement that moves towards or away relative to each other, thereby improving the reliability of the male sexual stimulation device 100.

The present disclosure further provides an alternative embodiment, referring to FIGS. 12 to 19. In this embodiment, the first massage component 20 and the second massage components 30 that are linearly movable towards or away from each other are provided. This embodiment differs from the above embodiments in the structure of the first massage component 20.

In this embodiment, the first massage component 20 includes a first massage portion 24 and a second massage portion 25 respectively located at two opposite lateral sides of the first cavity 11. The first massage portion 24 and the second massage portion 25 are drivable to move towards or away from each other along a lateral direction that non-parallel the longitudinal direction.

In some embodiments, the male sexual stimulation device 100 further includes a pinch component 70. The pinch component 70 drives the first massage portion 24 and the second massage portion 25 to move towards or away from each other when the first massage component 20 is driven to slide by the transmission component 40. In this way, it is possible to increase or decrease the size of the space of the first cavity 11, so as to achieve a periodic pinching massage for the penis inserted into the first case 11.

During use, after the penis has been inserted into the accommodating space 10 constituted by the first cavity 11 of the first massage component 20 and the second cavity 12 of the second massage component 30, the actuator 60 can be started, which outputs a driving force to the transmission component 40 which drives the first and second massage components 20, 30 to move towards or away from each other, so that the first and second massage components are able to form stimulating effects of pinching and holding for penis.

During the operation, the first massage portion 24 and the second massage portion 25 of the first massage component 20 are driven to move towards or away from each other, so as to simultaneously pinch the penis inserted into the first cavity 11 for a better massage effect.

Figure 18:
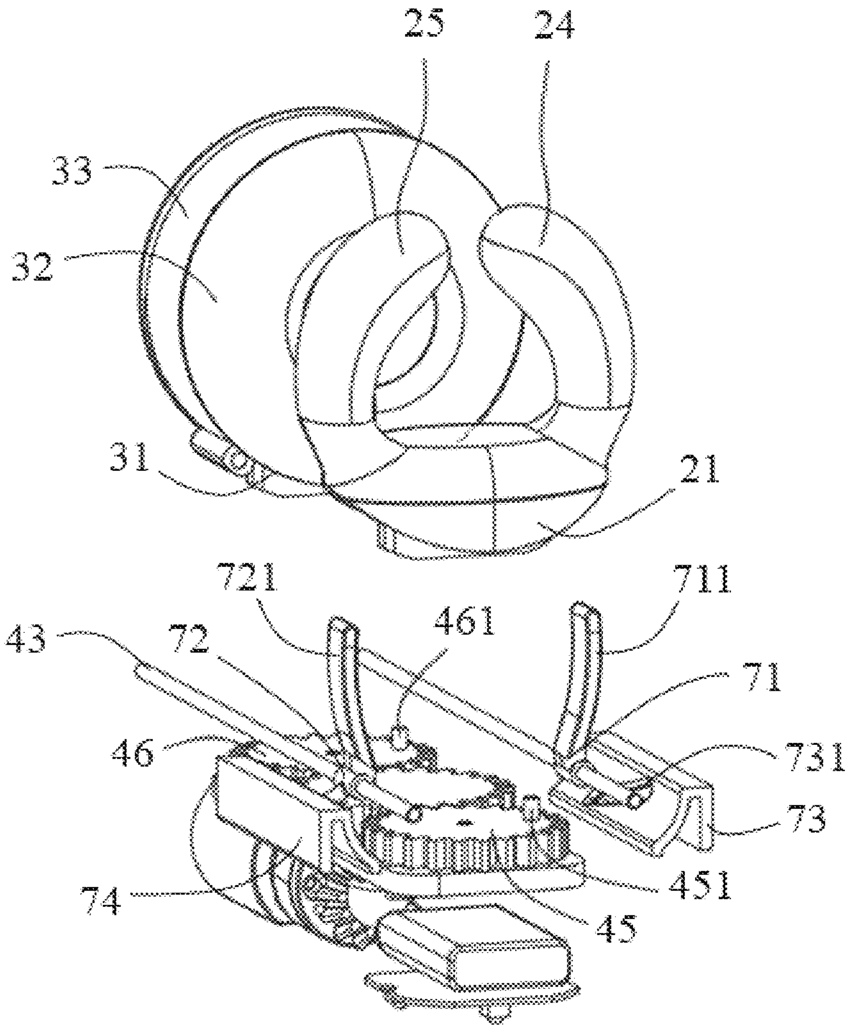
FIG. 18 is a partially exploded structural view of FIG. 12.
Figure 19:
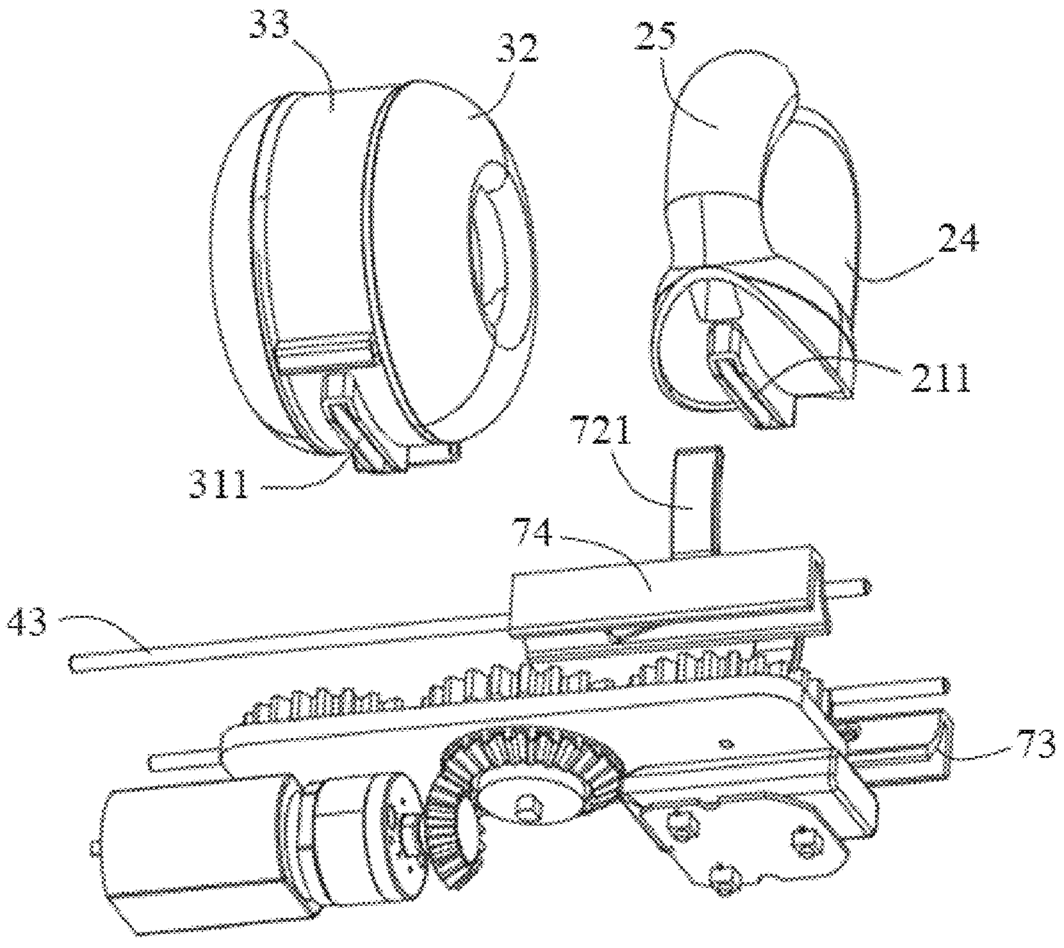
FIG. 19 is a structural schematic view from another view angle of FIG. 18.

Referring to FIGS. 18 and 19, the structure of the transmission component 40 of this embodiment is similar to that provided in the embodiment of FIGS. 2-5. The transmission component 40 includes a drive gear 44, a first driven gear 45, and a second driven gear 46, a first eccentric rod 451, a second eccentric rod 461, and two guide rails 43 extending along the longitudinal direction and arranged in parallel along the lateral direction. The actuator 60 includes a motor. The battery 82 is electrically connected to the circuit board 81. The circuit board 81 is electrically connected to the motor.

The drive gear 44 is in torque-transmission connection with the actuator 60. The first and second driven gears 45, 46 are both engaged with the drive gear 44 and arranged on radially opposite sides of the drive gear 44. The first eccentric rod 451 is fixed on the first driven gear 45 and slidably arranged within the first engagement groove 211 of the first guide slider 21. The second eccentric rod 461 is fixed on the second driven gear 46 and slidably arranged within the second engagement groove 311 of the second guide slider 31. Two sides of the second guide slider 31 are slidably mounted to the two guide rails 43 respectively. That is, the first eccentric rod 451 fixed on the first driven gear 45 serves as the first actuating element 41, a second eccentric rod 461 fixed on the second driven gear 46 serves as the second actuating element 42.

Figure 14:
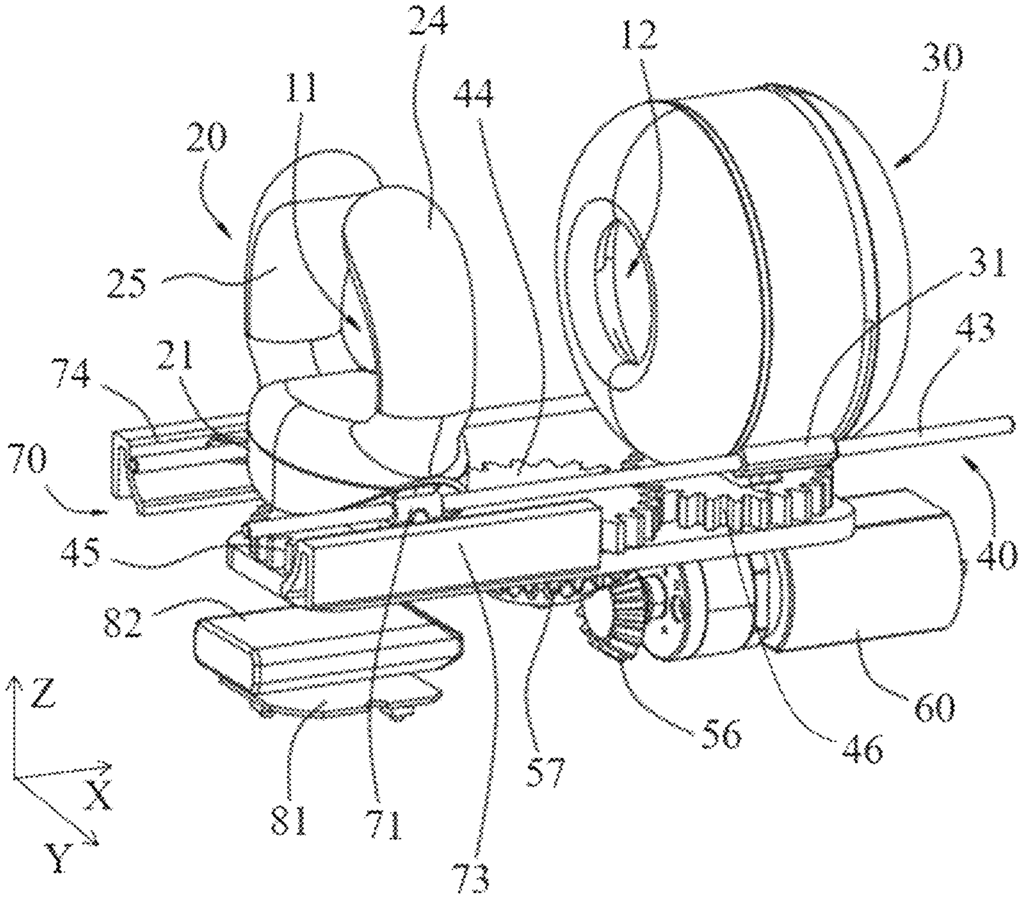
FIG. 14 is a structural schematic view illustrating the assembly of an actuator, a transmission component, and a pinch component of the male sexual stimulation device depicted in FIG. 12.
Figure 16:
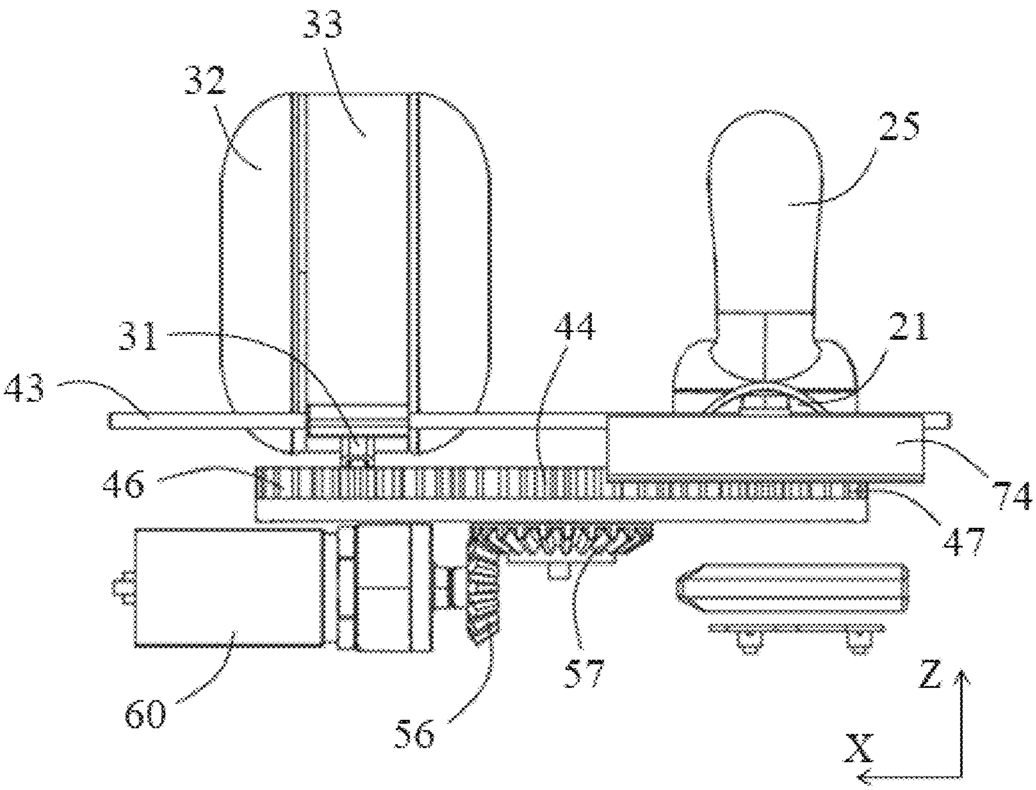
FIG. 16 is a schematic right side view of FIG. 14.

This embodiment differs from the first embodiment in that, referring to FIGS. 14 and 16, the transmission component 40 further includes a first bevel gear 56 and a second bevel gear 57. The first bevel gear 56 is connected to a drive shaft of the motor. The second bevel gear 57 is engaged with the first bevel gear 56 and is coaxially connected to the drive gear 44. Thus, the rotational power output from the motor is transferred to the second bevel gear 57 through the first bevel gear 56, and the second bevel gear 57 brings the drive gear 44 to rotate together, which can drive the first and second driven gears 45, 46 meshing with the drive gear 44 to rotate simultaneously. By means of the gear transmission, the transmission ratio can be made stable, the transmission of the power can be smooth, and it can effectively ensure that the first massage component 20 and the second massage component 30 accurately move towards or away from each other, thereby ensuring the massage effect on the penis.

Figure 15:
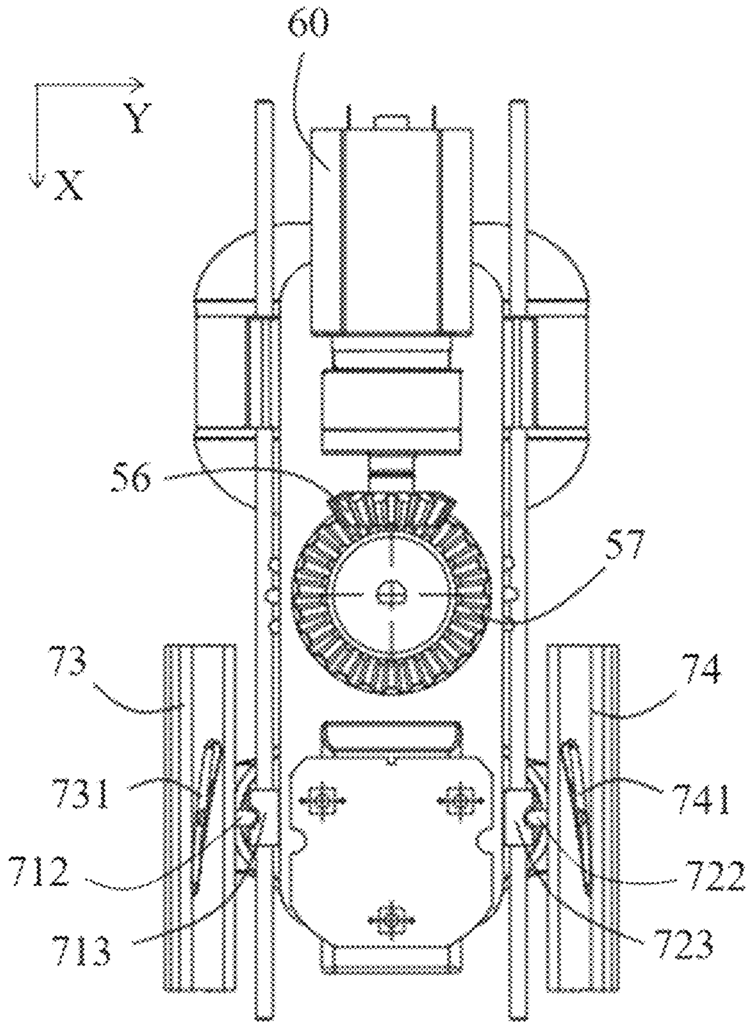
FIG. 15 is a schematic bottom plan view of FIG. 14.
Figure 17:
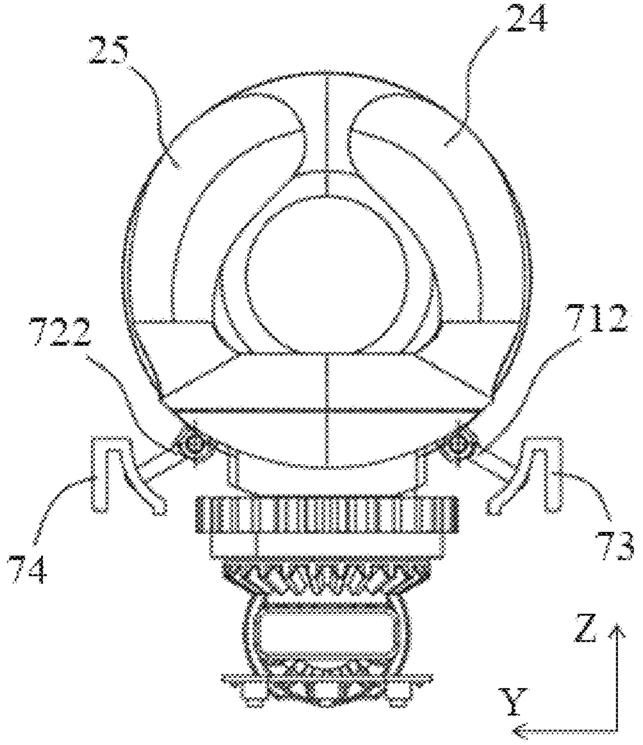
FIG. 17 is a schematic rear elevation view of FIG. 14.

In this embodiment, referring to FIGS. 14, 15 and 17, one end of the first massage portion 24 and one end of the second massage portion 25 are connected to two ends of the first guide slider 21, respectively. The first massage portion 24 and the second massage portion 25 are spaced apart from each other to enclose the first cavity 11. The pinch component 70 is configured to be movable and connected to at least one of the first and second massage portions 24, 25. So that at least one of the first and second massage portions 24, 25 is able to move towards or away from the center of the first cavity 11 to decrease or increase the space of the first cavity 11 under the actuation of the pinch component 70.

To ensure comfort during the penis pinching, both the first massage portion 24 and the second massage portion 25 are made of flexible materials, such as rubber, silicone, foam, or the like.

Specifically, there may be a variety of implementations that enable the reciprocating movements of the first and second massage portions 24, 25 towards or away from the center of the first cavity 11. For example, the pinch component 70 may adopt an inflatable airbag, and the expansion or contraction of the airbag can drive the first massage portion 24 and/or the second massage portion 25 to move. Alternatively, the pinch component 70 may employ a sliding component, which drives the first and second massage portions 24, 25 to slide towards or away from the center of the first cavity 11, or the like.

In particular, in this embodiment, the pinch component 70 includes a first swing rod 71, a second swing rod 72, a first actuating block 73, and a second actuating block 74. The first actuating block 73 and second actuating block 74 are respectively provided with a first inclined slot 731 and a second inclined slot 741. The extension directions of the first and second inclined slots 731, 741 are both inclined at an angle relative to the longitudinal direction. The extension directions of the first and second inclined slots 731, 741 may be parallel to each other.

The first swing rod 71 and the second swing rod 72 are slidably and rotatably mounted around the two guide rails 43 respectively.

Specifically, the first swing rod 71 includes a first tubular body 713 slidably mounted around one guide rail 43, a first swing arm 711 and a first guide arm 712 extending outwardly from the first tubular body 713. The first swing arm 711 and the first guide arm 712 extend in different directions. The first swing arm 711 passes through the first guide slider 21 and extends into the first massage portion 24. The first guide arm 712 is slidably engaged in the first inclined slot 731.

Similarly, the second swing rod 72 includes a second tubular body 723 slidably mounted around one guide rail 43, a second swing arm 721 and a second guide arm 722 extending outwardly from the second tubular body 723. The second swing arm 721 and the second guide arm 722 extend in different directions. The second swing arm 721 passes through the first guide slider 21 and extends into the second massage portion 25. The second guide arm 722 is slidably engaged in the second inclined slot 741.

When the first actuating element 41 drives the first guide slider 21 to reciprocate along the longitudinal direction, the first guide slider 21 drives the first swing rod 71 and the second swing rod 72 to slide along the longitudinal direction. As the first and second swing rods 71, 72 slide, the first guide arm 712 slides in the first inclined slot 731, and the second guide arm 722 slides in the second inclined slot 741. Due to the inclination of the slots 731, 741, when the first swing rod 71 and the second swing rod 72 slide in the longitudinal direction, the first and second guide arms 712, 722 slide inclinedly, which cause the first and second guide arms 712, 722 rotate about the guide rails 43, and in turn the first and second swing arms 711, 721 swing towards or away from each other.

Specifically, during the movement of the first massage component 20 along the guide rail 43 away from the second massage component 30, the first guide arm 712 and the second guide arm 722 simultaneously slide from the low point to the high point along the first inclined slot 721 and the second inclined slot 741, respectively. The first swing arm 711 and the second swing arm 721 rotate towards each other, with the central axis of the corresponding guide rail 43 as the axis of rotation. So that the first swing arm 711 and the second swing arm 721 drive the first massage portion 24 and the second massage portion 25, respectively, to move towards the center of the first cavity 11, thereby applying a pinching massage effect on the penis.

During the movement of the first massage component 20 along the guide rail 43 towards the second massage component 30, the first guide arm 712 and the second guide arm 722 simultaneously slide from the high point to the low point along the first inclined slot 721 and the second inclined slot 741, respectively. The first swing arm 711 and the second swing arm 721 rotate away from each other, with the central axis of the corresponding guide rail 43 as the axis of rotation. Consequently, the first swing arm 711 and the second swing arm 721 drive the first massage portion 24 and the second massage portion 25, respectively, to move apart, thereby releasing the pinching effect on the penis. Thus, in this embodiment, the first massage component 20 actually has two massage modes which are longitudinal sliding massage and lateral pinching massage, thereby further enhancing the massage effect.

In this embodiment, the structure of the second massage component 30 is the same as that in the embodiment shown in FIGS. 2-5, and therefore will not be repeated here.

In this embodiment, the movement of the first massage component 20 along the guide rail 43 away from the second massage component 30 causes the first massage portion 24 and the second massage portion 25 to move towards each other in the lateral direction; and the movement of the first massage component 20 along the guide rail 43 towards the second massage component 30 causes the first massage portion 24 and the second massage portion 25 to move away from each other in the lateral direction. However, it should be understood that, in other embodiments, the relationship between the longitudinal movement of the first massage component 20 relative to the second massage component 30 and the lateral movements of the first and the second massage portions 24, 25 may be opposite to that in this embodiment, by changing the extension direction of the inclined slots.

In some embodiments, at least one of the first massage portion 24 and the second massage portion 25 is provided with at least one vibration component 80. The vibration component 80 may be a vibration motor. Preferably, each of the first massage portion 24 and the second massage portion 25 is provided with one vibration component 80 installed inside. During the pinching massage applied by the first and second massage portions 24, 25 on the penis, the at least one vibration component 80 simultaneously applies a vibration effect on the penis, further improving the massage effect. In other embodiments, the second massage component 30 is also provided with the at least one vibration component 80 to further enhance the massage effect on the penis.

Finally, it should be noted that the above descriptions pertain only to the preferred embodiments of the present disclosure and should not be construed as limiting the protection scope of the present disclosure. While the present disclosure has been detailed with reference to the aforementioned embodiments, it will be apparent to those skilled in the art that modifications can be made to the technical solutions described, or some technical features can be equivalently replaced. Any modifications, equivalent replacements, or improvements made within the spirit and principles of the present disclosure should fall within its scope of protection.

What is claimed is:

1. A male sexual stimulation device having an accommodating space extending along a longitudinal direction thereof for insertion of a male penis, the male sexual stimulation device comprising:

a first massage component that is drivable to slide in the longitudinal direction, the first massage component defining a first cavity constituting a first part of the accommodating space;

a second massage component that is drivable to slide in the longitudinal direction, the second massage component defining a second cavity constituting a second part of the accommodating space, wherein the first massage component and the second massage component are arranged one after another in the longitudinal direction;

wherein the first massage component and second massage component are slidable towards and away from each other in the longitudinal direction;

wherein the male sexual stimulation device further comprises an actuator and a transmission component in torque-transmission connection with the actuator;

wherein the first massage component is in torque-transmission connection with the transmission component, and the actuator drives the first massage component to slide via the transmission component;

wherein the second massage component is in torque-transmission connection with the transmission component, and the actuator drives the second massage component to slide via the transmission component simultaneously with the first massage component;

wherein the transmission component comprises a first actuating element connected to the first massage component and a second actuating element connected to the second massage component, the first and second actuating elements are driven by the actuator and rotate and move linearly in the longitudinal direction to drive the first and second massage components to slide towards and away from each other along the longitudinal direction; and wherein the first massage component comprises a first guide slider having a first engagement groove, and the second massage component comprises a second guide slider having a second engagement groove; the transmission component comprises at least one guide rail extending in the longitudinal direction, and the first and second guide sliders are respectively slidably mounted on the at least one guide rail; extension directions of the first engagement groove and the second engagement groove are elongated and intersect respectively sliding directions of the first massage component and the second massage component; and the first actuating element and the second actuating element are respectively slidably engaged in the first engagement groove and the second engagement groove.

2. The male sexual stimulation device according to claim 1, wherein the transmission component further comprises a drive gear, a first driven gear, and a second driven gear; a first eccentric rod fixed on the first driven gear serves as the first actuating element, a second eccentric rod fixed on the second driven gear serves as the second actuating element, and the first and second driven gears are both engaged with the drive gear and arranged on radially opposite sides of the drive gear, the drive gear is in torque-transmission connection with the actuator.

3. The male sexual stimulation device according to claim 1, wherein at least one of the first massage portion and the second massage portion is provided with at least one vibration component.

4. The male sexual stimulation device according to claim 1, wherein the first massage component comprises a first flexible body defining the first cavity and a first support, and the second massage component comprises a second flexible body defining the second cavity and a second support.

5. The male sexual stimulation device according to claim 4, wherein at least one of the first flexible body and the second flexible body is a closed annular structure or an annular structure with a notch.

6. A male sexual stimulation device having an accommodating space extending along a longitudinal direction thereof for insertion of a male penis, the male sexual stimulation device comprising:

a first massage component that is drivable to slide in the longitudinal direction, the first massage component defining a first cavity constituting a first part of the accommodating space;

a second massage component that is drivable to slide in the longitudinal direction, the second massage component defining a second cavity constituting a second part of the accommodating space, wherein the first massage component and the second massage component are arranged one after another in the longitudinal direction;

wherein the first massage component and second massage component are slidable towards and away from each other in the longitudinal direction;

wherein the male sexual stimulation device further comprises an actuator and a transmission component in torque-transmission connection with the actuator;

wherein the first massage component is in torque-transmission connection with the transmission component, and the actuator drives the first massage component to slide via the transmission component;

wherein the second massage component is in torque-transmission connection with the transmission component, and the actuator drives the second massage component to slide via the transmission component simultaneously with the first massage component;

wherein the transmission component comprises a first actuating element connected to the first massage component and a second actuating element connected to the second massage component, the first and second actuating elements are driven by the actuator and rotate and move linearly in the longitudinal direction to drive the first and second massage components to slide towards and away from each other along the longitudinal direction; and wherein the first massage component comprises a first guide slider, and the second massage component comprises a second guide slider; the transmission component comprises at least one guide rail extending in the longitudinal direction, and the first and second guide sliders are respectively slidably mounted on the at least one guide rail; wherein the transmission component further comprises a first moving block having a first rack, a second moving block having a second rack, and a transmission gear; the first and second racks are both meshed with the transmission gear, and a portion of the first moving block serves as the first actuating element and is connected to the first guide slider, and a portion of the second moving block serves as the second actuating element and is connected to the second guide slider.

7. The male sexual stimulation device according to claim 6, wherein the transmission component further comprises a rotating wheel having a third eccentric rod, and a push-pull rod having an elongated hole; the third eccentric rod is slidably engaged into the elongated hole, an end of the push-pull rod is connected to the first moving block, and the rotating wheel is in torque-transmission connection with the actuator.

8. The male sexual stimulation device according to claim 6, wherein the transmission component further comprises a first transmission rod having a first gear portion and a first threaded portion, and a first gear set, the first gear set is in torque-transmission connection with the actuator and engaged with the first gear portion, the first moving block comprises a first threaded sleeve, and the first threaded sleeve is threadedly engaged with the first threaded portion.

9. A male sexual stimulation device having an accommodating space extending along a longitudinal direction thereof for insertion of a male penis, the male sexual stimulation device comprising:

a first massage component that is drivable to slide in the longitudinal direction, the first massage component defining a first cavity constituting a first part of the accommodating space;

a second massage component that is drivable to slide in the longitudinal direction, the second massage component defining a second cavity constituting a second part of the accommodating space, wherein the first massage component and the second massage component are arranged one after another in the longitudinal direction;

wherein the first massage component and second massage component are slidable towards and away from each other in the longitudinal direction;

wherein the male sexual stimulation device further comprises an actuator and a transmission component in torque-transmission connection with the actuator;

wherein the first massage component is in torque-transmission connection with the transmission component, and the actuator drives the first massage component to slide via the transmission component;

wherein the second massage component is in torque-transmission connection with the transmission component, and the actuator drives the second massage component to slide via the transmission component simultaneously with the first massage component;

wherein the transmission component comprises a first actuating element connected to the first massage component and a second actuating element connected to the second massage component, the first and second actuating elements are driven by the actuator and rotate and move linearly in the longitudinal direction to drive the first and second massage components to slide towards and away from each other along the longitudinal direction;

wherein the first massage component comprises a first guide slider, and the second massage component comprises a second guide slider; the transmission component comprises at least one guide rail extending in the longitudinal direction, and the first and second guide sliders are respectively slidably mounted on the at least one guide rail; wherein the transmission component further comprises a first moving block, a second moving block, a first transmission rod, and a first gear set, a portion of the first moving block serves as the first actuating element and is connected to the first guide slider, and a portion of the second moving block serves as the second actuating element and is connected to the second guide slider, the first transmission rod comprises a first gear portion, a first threaded portion, and a second threaded portion;

wherein the first gear portion, the first threaded portion and the second threaded portion are spaced apart along an axial direction of the first transmission rod, the first gear set is in torque-transmission connection with the actuator and engaged with the first gear portion; and wherein the first moving block comprises a first threaded sleeve threadedly engaged with the first threaded portion, the second moving block comprises a second threaded sleeve threadedly engaged with the second threaded portion.

10. A male sexual stimulation device having an accommodating space extending along a longitudinal direction thereof for insertion of a male penis, the male sexual stimulation device comprising:

a first massage component that is drivable to slide in the longitudinal direction, the first massage component defining a first cavity constituting a first part of the accommodating space;

a second massage component that is drivable to slide in the longitudinal direction, the second massage component defining a second cavity constituting a second part of the accommodating space, wherein the first massage component and the second massage component are arranged one after another in the longitudinal direction;

wherein the first massage component and second massage component are slidable towards and away from each other in the longitudinal direction;

wherein the male sexual stimulation device further comprises an actuator and a transmission component in torque-transmission connection with the actuator;

wherein the first massage component is in torque-transmission connection with the transmission component, and the actuator drives the first massage component to slide via the transmission component;

wherein the second massage component is in torque-transmission connection with the transmission component, and the actuator drives the second massage component to slide via the transmission component simultaneously with the first massage component;

wherein the transmission component comprises a first actuating element connected to the first massage component and a second actuating element connected to the second massage component, the first and second actuating elements are driven by the actuator and rotate and move linearly in the longitudinal direction to drive the first and second massage components to slide towards and away from each other along the longitudinal direction;

wherein the first massage component comprises a first guide slider, and the second massage component comprises a second guide slider; the transmission component comprises at least one guide rail extending in the longitudinal direction, and the first and second guide sliders are respectively slidably mounted on the at least one guide rail;

wherein the actuator comprises a first motor and a second motor, and the transmission component further comprises a first moving block, a second moving block, a first transmission rod, a second transmission rod, a first gear set, and a second gear set; a portion of the first moving block serves as the first actuating element and is connected to the first guide slider, and a portion of the second moving block serves as the second actuating element and is connected to the second guide slider, the first transmission rod comprises a first gear portion and a first threaded portion, the second transmission rod comprises a second gear portion and a second threaded portion;

wherein the first gear set is in torque-transmission connection with the first motor and engaged with the first gear portion, and the second gear set is in torque-transmission connection with the first motor and engaged with the second gear portion; and wherein the first moving block comprises a first threaded sleeve threadedly engaged with the first threaded portion, the second moving block comprises a second threaded sleeve threadedly engaged with the second threaded portion.

11. A male sexual stimulation device having an accommodating space extending along a longitudinal direction thereof for insertion of a male penis, the male sexual stimulation device comprising:

a first massage component that is drivable to slide in the longitudinal direction, the first massage component defining a first cavity constituting a first part of the accommodating space;

a second massage component that is drivable to slide in the longitudinal direction, the second massage component defining a second cavity constituting a second part of the accommodating space, wherein the first massage component and the second massage component are arranged one after another in the longitudinal direction;

wherein the first massage component and second massage component are slidable towards and away from each other in the longitudinal direction;

wherein the male sexual stimulation device further comprises an actuator and a transmission component in torque-transmission connection with the actuator;

wherein the first massage component is in torque-transmission connection with the transmission component, and the actuator drives the first massage component to slide via the transmission component;

wherein the first massage component comprises a first massage portion and a second massage portion respectively located at two opposite lateral sides of the first cavity, and wherein the first massage portion and the second massage portion are drivable to move towards and away from each other along a lateral direction that is non-parallel to the longitudinal direction.

12. The male sexual stimulation device according to claim 11, further comprising a pinch component, wherein the pinch component drives the first massage portion and the second massage portion to move towards and away from each other when the first massage component is driven to slide by the transmission component.

13. The male sexual stimulation device according to claim 12, wherein the pinch component comprises a first swing rod, a second swing rod, a first actuating block, a second actuating block, the transmission component comprises at least one guide rail extending in the longitudinal direction;

wherein the first actuating block and second actuating block are respectively provided with a first inclined slot and a second inclined slot, extension directions of the first and second inclined slots are both inclined at an angle relative to the longitudinal direction;

wherein the first swing rod comprises a first tubular body slidably mounted around one guide rail, a first swing arm and a first guide arm extending outwardly from the first tubular body, the first swing arm extends into the first massage portion, the first guide arm is slidably engaged in the first inclined slot; the second swing rod comprises a second tubular body slidably mounted around one guide rail, a second swing arm and a second guide arm extending outwardly from the second tubular body, the second swing arm extends into the second massage portion, the second guide arm is slidably engaged in the second inclined slot.

14. The male sexual stimulation device according to claim 13, wherein the transmission component comprises a first actuating element, the first massage component comprises a first guide slider; the first massage portion, the second massage portion and the first actuating element are respectively connected to the first guide slider, the first swing arm passes through the first guide slider and extends into the first massage portion, and the second swing arm passes through the first guide slider and extends into the second massage portion, the first actuating element drives the first guide slider to reciprocate in the longitudinal direction, and the first guide slider drives the first swing rod and the second swing rod to slide along the first inclined slot and the second inclined slot, respectively.

15. A male sexual stimulation device, comprising:

a transmission component;

a first massage component in torque-transmission connection with the transmission component;

a second massage component in torque-transmission connection with the transmission component;

wherein the transmission component is configured to drive the first massage component and the second massage component to move towards and away from each other, the first massage component and the second massage component cooperatively define a accommodating space for accommodating a male penis; and wherein the transmission component comprises a drive gear, a first driven gear having a first eccentric rod, a second driven gear having a second eccentric rod, and at least one guide rail respectively slidably engaged with the first and second massage components;

the drive gear drives the first driven gear and the second driven gear to rotate simultaneously, so that the first eccentric rod and the second eccentric rod are able to drive the first massage component and the second massage component to move towards and away from each other on the at least one guide rail, respectively.

16. The male sexual stimulation device according to claim 15, further comprising a pinch component, wherein the pinch component comprises a first swing rod, a second swing rod, a first actuating block having a first inclined slot, a second actuating block having a second inclined slot, the first massage component comprises a first massage portion, a second massage portion and a first guide slider, the first massage portion and the second massage portion respectively located at two opposite lateral sides of the first cavity;

the first eccentric rod drives the first guide slider to slide, the first guide slider simultaneously drives the first swing rod and the second swing rod to slide on the at least one guide rail, a first guide arm of the first swing rod drives a first swing arm of the first swing rod to swing by sliding in the first inclined slot, a second guide arm of the second swing rod drives a second swing arm of the second swing rod to swing by sliding in the second inclined slot, and the first guide arm and the second guide arm respectively drive the first massage portion and the second massage portion to move towards and away from each other, thereby changing the dimension of the first cavity at a portion between the first massage portion and the second massage portion.

* * * * *